(12) United States Patent
Laws et al.

(10) Patent No.: US 11,669,108 B2
(45) Date of Patent: Jun. 6, 2023

(54) CONTROL OF AUTOMATED FOLLOWING IN VEHICLE CONVOYS

(71) Applicant: Peloton Technology, Inc., Mountain View, CA (US)

(72) Inventors: Shad Laws, Palo Alto, CA (US); Joshua Switkes, Mountain View, CA (US); Art Gavrysh, Mountain View, CA (US); Marc Tange, Mountain View, CA (US); Mark Herbert, Mountain View, CA (US); Colleen Twitty, Mountain View, CA (US); Dean Hogle, Mountain View, CA (US); Andrew Tamoney, Mountain View, CA (US); Eric Monsler, Mountain View, CA (US); Carlos Rosario, Mountain View, CA (US); Oliver Bayley, Mountain View, CA (US); Richard Pallo, Mountain View, CA (US); Louis Donayre, Mountain View, CA (US); Laurenz Laubinger, Mountain View, CA (US); Brian Smartt, Mountain View, CA (US); Joyce Tam, Mountain View, CA (US); Brian Silverman, Mountain View, CA (US); Tabitha Jarvis, Mountain View, CA (US); Murad Bharwani, Mountain View, CA (US); Steven Erlein, Mountain View, CA (US); Austin Schuh, Mountain View, CA (US); Mark Luckevich, Mountain View, CA (US)

(73) Assignee: Peloton Technology, Inc., Mountain View, CA (US)

(*) Notice: Subject to any disclaimer, the term of this patent is extended or adjusted under 35 U.S.C. 154(b) by 391 days.

(21) Appl. No.: 16/504,230

(22) Filed: Jul. 6, 2019

(65) Prior Publication Data
US 2020/0057453 A1    Feb. 20, 2020

Related U.S. Application Data

(60) Provisional application No. 62/695,014, filed on Jul. 7, 2018.

(51) Int. Cl.
*G05D 1/02* (2020.01)
*B60W 30/18* (2012.01)
(Continued)

(52) U.S. Cl.
CPC .......... *G05D 1/0293* (2013.01); *B60W 10/04* (2013.01); *B60W 10/18* (2013.01); *B60W 10/20* (2013.01);
(Continued)

(58) Field of Classification Search
CPC ............. G05D 1/0293; G05D 1/0088; G05D 2201/0213; B60W 10/04; B60W 10/18;
(Continued)

(56) References Cited

U.S. PATENT DOCUMENTS

2007/0233337 A1* 10/2007 Plishner ............... G05D 1/0295
701/23
2008/0059007 A1*  3/2008 Whittaker ............... G08G 1/22
701/2
(Continued)

*Primary Examiner* — Nga X Nguyen
(74) *Attorney, Agent, or Firm* — Redbrick IP, P.C.

(57) ABSTRACT

Disclosed herein are a method and apparatus for automated following behind a lead vehicle. The lead vehicle navigates a path from a starting point to a destination. The lead vehicle and the following vehicle are connected via V2V communication, allowing one or more following vehicles to detect the path taken by the lead vehicle. A computerized control system on the following vehicle (a Follow-the-Leader, or FTL, system) allows the following vehicle to mimic the (Continued)

behavior of the lead vehicle, with the FTL system controlling steering to guide the following vehicle along the path previously navigated by the lead vehicle. In some embodiments, the lead vehicle and following vehicle may both use Global Navigation Satellite System (GNSS) position coordinates. In some embodiments, the following vehicle may also have a system of sensors to maintain a gap between the following and lead vehicles.

10 Claims, 16 Drawing Sheets

(51) Int. Cl.
    *B60W 10/20*      (2006.01)
    *B60W 10/18*      (2012.01)
    *B60W 10/04*      (2006.01)
    *G05D 1/00*      (2006.01)

(52) U.S. Cl.
    CPC ........... *B60W 30/18* (2013.01); *G05D 1/0088* (2013.01); *B60W 2420/42* (2013.01); *B60W 2420/52* (2013.01); *B60W 2556/60* (2020.02); *B60W 2556/65* (2020.02); *B60W 2710/0666* (2013.01); *B60W 2710/18* (2013.01); *B60W 2710/20* (2013.01); *B60W 2720/106* (2013.01); *B60W 2756/10* (2020.02); *G05D 2201/0213* (2013.01)

(58) Field of Classification Search
    CPC .. B60W 10/20; B60W 30/18; B60W 2756/10; B60W 2556/65; B60W 2556/60; B60W 2420/42; B60W 2420/52; B60W 2710/0666; B60W 2710/18; B60W 2710/20; B60W 2720/106; B60W 30/165; G08G 1/096827; G08G 1/22
    See application file for complete search history.

(56) References Cited

U.S. PATENT DOCUMENTS

| | | | | |
|---|---|---|---|---|
| 2013/0066511 | A1* | 3/2013 | Switkes | G01S 13/931 701/28 |
| 2017/0168504 | A1* | 6/2017 | Darms | G08G 1/0145 |
| 2019/0137991 | A1* | 5/2019 | Agarwal | B66F 9/063 |
| 2022/0396267 | A1* | 12/2022 | Kim | B60W 50/14 |

* cited by examiner

CONTROL OF AUTOMATED FOLLOWING IN VEHICLE CONVOYS

CROSS-REFERENCE TO RELATED APPLICATIONS

This application claims priority of U.S. Provisional Patent Application No. 62/695,014 filed Jul. 7, 2018, which is herein incorporated by reference in its entirety for all purposes.

BACKGROUND

Vehicle automation is a topic of intense development in recent years. Improvements in computing power, artificial intelligence (AI), and sensor systems such as radar and lidar have already enabled the widespread adoption of cruise control, lane keeping/centering, and adaptive cruise control systems for assisting drivers, and are enabling the development of vehicles which may even operate without a driver. In recent years, the development of vehicle-to-vehicle (V2V) communications protocols, using Dedicated Short Range Communications (DSRC) and other RF communication bands, and sophisticated radar processing algorithms to accurately monitor the gaps between vehicles allows driver-assistive platooning, in which a plurality or more vehicles (typically trucks) can follow closely, or "draft", each other, safely, thereby saving fuel.

In the driver-assistive platooning case (e.g., where two or more vehicles communicate through a link), although the gap between two vehicles is managed by automated computers, allowing the vehicles to speed up or slow down in tandem, the drivers are still ultimately in control. The front driver of a platoon is always managing the speed, braking, and steering of the front vehicle, and the following driver still controls steering, and must be ready to assume full control of the vehicle if the platoon dissolves.

Driver-assistive platooning trucks deliver the best improvement in fuel savings at highway speeds, but there are circumstances in which convoying vehicles, especially trucks, along the same route even at lower speeds can be advantageous. One example is that of unloading cargo, where multiple containers from a ship in a port terminal need to be transported to a nearby railhead. However, convoying trucks for short runs like this can be delayed by a chronic shortage of truck drivers.

To get around the problem of too many loads and too few drivers, "road trains" of tractors with multiple trailers and a single driver can be formed. However, road trains have far more difficulty navigating around sharp corners and complex obstacles of an environment such as a dockyard, and are generally less safe and less flexible.

There is therefore a need for an automatic vehicle control system that could allow a driverless following vehicle to reproduce the travel of a leading vehicle, resulting in a single-driver platoon.

SUMMARY

Disclosed herein are a method and apparatus that enables one or more vehicles to engage in automated following behind a lead vehicle.

In some embodiments, the lead vehicle in a convoy will have a driver who navigates through a route from a starting point to a destination. The lead vehicle and the following vehicle will be communicatively connected via a V2V communication system, allowing one or more following vehicles to detect the path taken by the lead vehicle. In some embodiments, the lead vehicle may also transmit a corresponding set of sensor inputs received by the lead vehicle to the following vehicle, so the following vehicle can confirm "landmarks" along the route.

In some embodiments, a control system included in at least a following vehicle (e.g., an automated following system, also known as a Follow-the-Leader, or "FTL", system which may be included in a plurality of vehicles) is configured to allow the following vehicle to mimic the behavior of the lead vehicle, with the FTL system controlling steering to guide the following vehicle through a virtual "envelope" in space previously navigated by the lead vehicle. The following vehicle may also have its own system of sensors to guarantee that a safe gap be maintained between the following vehicle and other vehicles on the road (including the lead vehicle). It should be understood that a lead vehicle may include at least some, if not all of the same systems as a follow vehicle (e.g., both may be configured to be FTL vehicles such that either vehicle can fulfill either role as leader or follower). In some embodiments, the following vehicle may also be comparing its own set of sensor inputs to information received from the lead vehicle about the sensor signals at the corresponding position, and if significant disagreement between the signals is observed, the following vehicle may break out of the convoy and enter a fail-safe mode (for example, by pulling off the road and stopping). In various embodiments herein, a platoon or platooning may be referred to, which is where a first vehicle controls and/or commands a second vehicle (e.g., where a front vehicle sends a signal that can cause an action to occur on a rear vehicle's brake and engine systems). In some embodiments, vehicles my operate in an FTL-mode (colloquially called "FTLing") or travel in an FTL platoon, which is where, as described above, a first vehicle may control the steering of the second vehicle in addition to its brake and engine systems (or at least a portion thereof). Further, it should be understood, that in some embodiments a rear vehicle may control a front vehicle.

In some embodiments, the lead vehicle information may include Global Navigation Satellite System (GNSS) position information. In some embodiments, two or more vehicles may be convoyed to follow a single lead vehicle. In the case where three or more vehicles are convoying, the second vehicle in the convoy may be both a following vehicle and a lead vehicle, as the vehicle in front of it may at least in part control it, and it may at least in part control the vehicle behind it.

DETAILED DESCRIPTION

It should be understood that headings included herein are for convenience/ease of reading, and are not to be taken as limiting the disclosure in any way. Further, an enumerated listing of items or steps (e.g., in a method) does not imply that any or all of these items are mutually exclusive, must occur, or must occur in a particular order. Nor does any enumerated list imply that additional items or steps (which may not be shown) may not be included.

I. Introduction

This Application discloses embodiments for automated following in vehicle convoys. The embodiments described here may be especially applicable for use in trucking, where multiple tractor-trailer trucks often need to be loaded in one location (such as a ship dock, railhead, warehouse, mine, forest, farm, etc.) and proceed to a second location (such as a railhead, distribution center, silo, processing center, ship dock, etc.), sometimes within a very tight time window (e.g. in the few hours after a container ship or railcar has arrived) and sometimes with much more flexibility in timing.

Common to the embodiments as described here is the assumption that the lead vehicle in the convoy will still have a driver, and it is this driver who makes decisions for the lead vehicle about what path to follow. However, the embodiments of methods and systems for automated following for the following vehicles may in fact be equally applicable for a system in which the control of the lead vehicle is also partially or fully automated, driven remotely, or where more than two vehicles are considered and thus a following vehicle may be following an automated vehicle which is itself following a human-driven vehicle. Further, in some embodiments it is contemplated that a rear vehicle, which includes a human driver, may at least in part control a lead vehicle that does not include a human driver.

Although the example of automated following from a ship to a railhead is used for some of the examples of embodiments in this disclosure, automated following can be used on any highways, roads, paths, construction yards, mines, etc. where two vehicles need to follow what is essentially the same route. Likewise, although the examples show either automated following with a gap (FIGS. 1B-1D) or automated following at a later time (FIGS. 2A-2D), hybrid embodiments in which the following vehicle mostly follows with a gap, but can also follow based on received path information (for example, when the rear of V1 may no longer be clearly identified by V2, such as when V1 is blocked by other cargo containers, going around a corner, etc.) And, likewise, although the illustrations used will show tractor-trailer trucks, for which automated following can be especially useful, the methods and systems disclosed here can be used for any vehicles that are designated to follow what is essentially the same route.

II. A Use Example

Figure 1A:
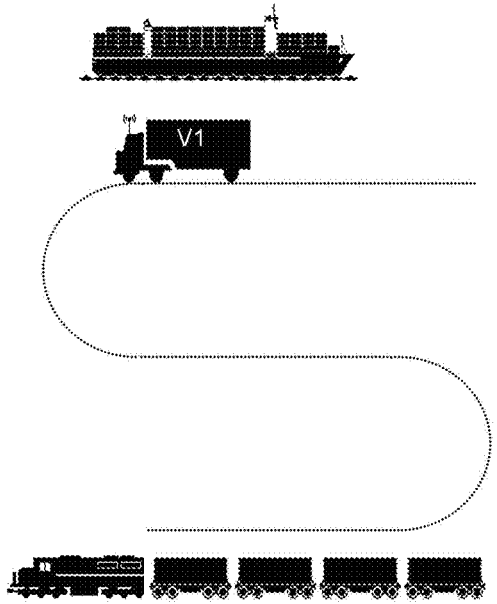
FIG. 1A illustrates a schematic of a first vehicle (V1) positioned at a port to take a load from a ship to a railhead, in accordance with some embodiments.
Figure 1B:
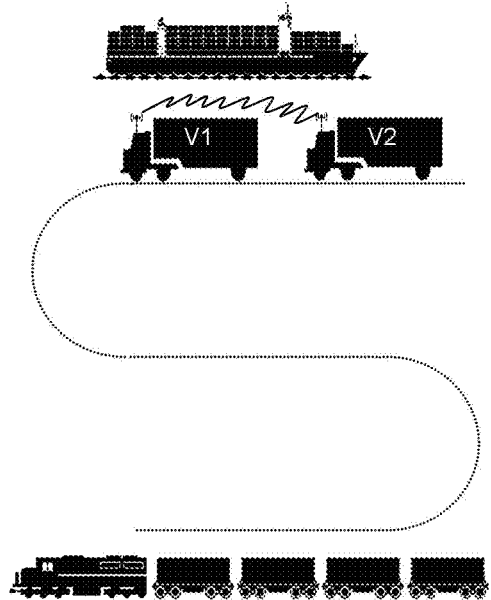
FIG. 1B illustrates a schematic of a second vehicle (V2) positioned to connect with V1 and establishing V2V contact, in accordance with some embodiments.

FIGS. 1A-1D illustrated an example of one possible use for an automated following system. In FIG. 1A, a first vehicle (marked V1) is shown by a ship in port, waiting to transport a container from a cargo ship to a railhead (Note: this is one example only, and is not meant to be limiting; other uses will be apparent to one skilled in the art). Once the first vehicle is in place, a second vehicle (marked V2) is positioned relative to V1 as illustrated in FIG. 1B, and a V2V communication between V1 and V2 is established. In this schematic use case, the second, following vehicle (V2) is equipped with a Follow-the-Leader system (FTL System) comprising a computerized controller and software to implement automated following software programming. Of course, it should be understood that more than one vehicle may be equipped with some or all of an FTL system. In other words, herein, an FTL system may refer to a system included in one vehicle, or multiple vehicles.

Figure 1C:
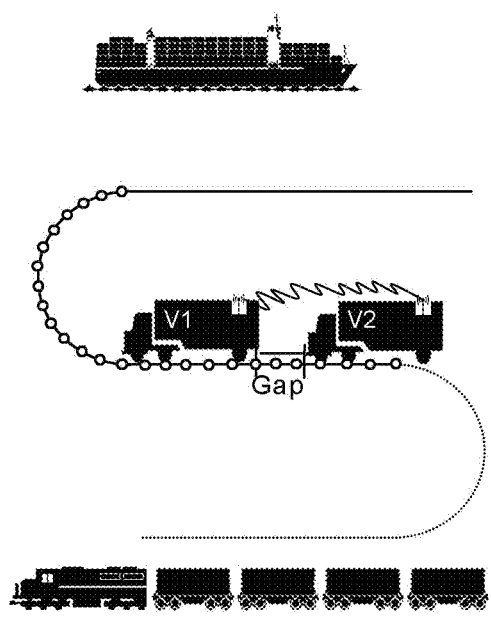
FIG. 1C illustrates a schematic of V2 following V1 while in V2V contact and maintaining a gap between vehicles, in accordance with some embodiments.

Once a link is established, V1 can begin navigating a path from the ship to the railhead, and be followed by V2, as shown in FIG. 1C. During this time, the two vehicles remain in V2V communication, allowing V1 to continue to communicate path information to V2. The path information (also known as a trace or breadcrumbs) may be transmitted from V1 to V2 periodically, illustrated in FIGS. 1C and 1D by small circles positioned along the path. Furthermore, the FTL system may equip V2 with systems for vehicle identification/perception, localization, and automated following control, so that V2 follows V1 with lateral control (for example by commanding steer angle) to maintain its path and longitudinal control (for example by commanding engine torque and braking) to manage a gap between the vehicles according to a policy, which may vary depending on vehicle speed or location, while in transit. In some embodiments, this will be enabled by using technology developed for driver-assistive platooning systems.

In one or more embodiments, steering can be controlled and/or determined either by torque or by angle. In some embodiments, a human driver in a leading vehicle in an FTL system may turn the wheel, and a steer angle and/or torque applied to a steering wheel may be determined (e.g., via an angular sensor on the steering column). That information can be gathered by an ECU, and then sent via a link to a following vehicle. Based on that information, the following vehicle may determine a path, derived in part from the front vehicle's former location (e.g., over a specified time). Based on this path, derived from the front vehicle's trajectory and in some embodiments by other static information (e.g., parameters for each vehicle such as wheelbase or kingpin location, which may be dissimilar) or dynamic information (e.g., path tracking errors or locations of other vehicles), a controller can generate steer angle commands such that the rear vehicle can follow this path. Based on these desired steer angles, a lower-level controller may be used to control a specific hardware on the steering system (e.g., a brushless DC motor on the steering column). In some embodiments, information generated by the lead vehicle may be abstracted (e.g., encoded into a common format) such that a rear vehicle may receive the abstracted instructions (e.g., in the common format) and respond accordingly. Such an embodiment may assist vehicles that are different (e.g., made by different manufacturers) or would otherwise be incompatible.

Figure 1D:
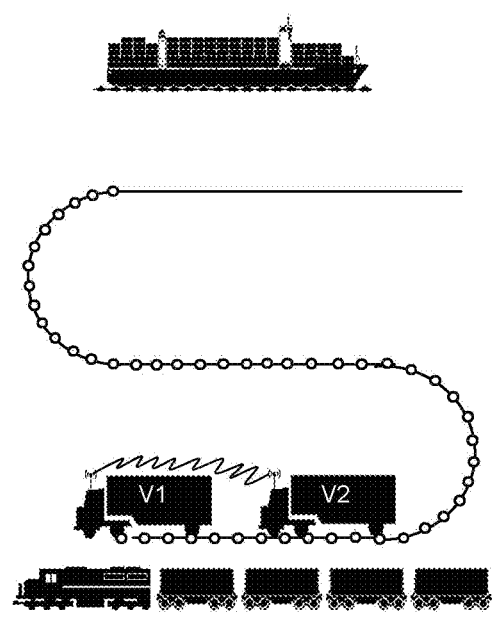
FIG. 1D illustrates a schematic of V2 and V1 both arriving at the railhead, in accordance with some embodiments.

In FIG. 1D, V1 and V2, still in V2V contact, have both arrived at the railhead and are both ready to unload their cargo to the waiting train.

III. A Second Use Example

Figure 2A:
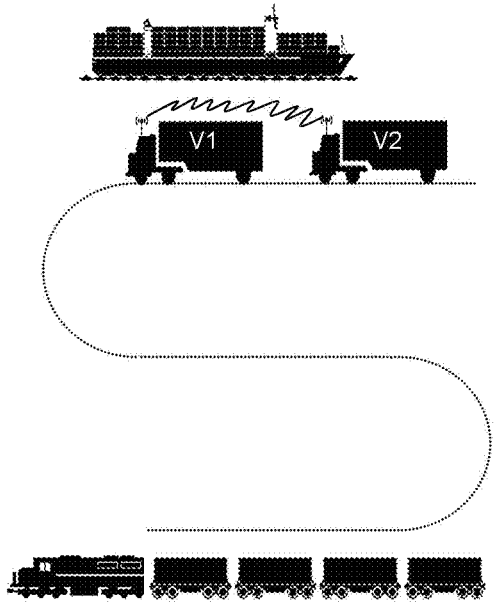
FIG. 2A illustrates a schematic of a first vehicle (V1) positioned in V2V contact with a second vehicle (V2) at a port, to take loads from a ship to a railhead, in accordance with some embodiments.

FIGS. 2A-2D illustrate an example of another possible use for an automated following system. In FIG. 2A, a first vehicle (marked V1) and a second vehicle (marked V2) are shown by a ship in port, waiting to transport a container from a cargo ship to a railhead, with a V2V communication between V1 and V2 established. In this schematic use case, the second, following vehicle (V2) will be equipped with a Follow-the-Leader system comprising a computerized controller and software to implement automated following software programming. Both vehicles may also be wirelessly connected to remote computers (e.g., the cloud, or network operation center "NOC") to further coordinate their actions with those of other agents (e.g., shipyards, shippers, receivers, air or sea ships, other vehicles, cargo containers, cranes, video cameras, infrastructures, weather and traffic information and forecasts, electronic logging devices, logistic systems, distribution centers, safety devices, trailer or chassis systems, hand-held mobile devices, air cargo, internet-of-things "IoT" devices, etc.)

Figure 2B:
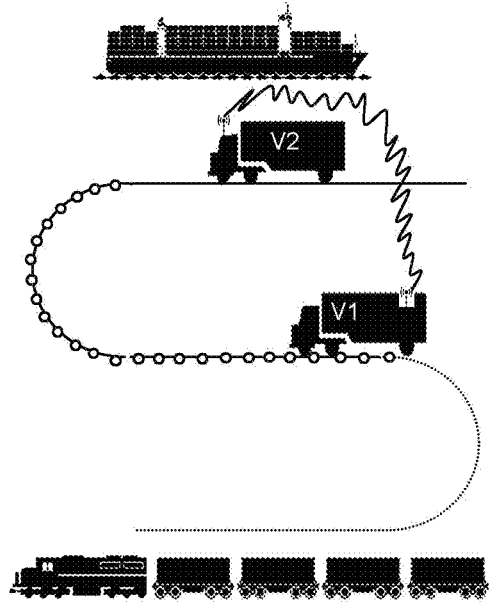
FIG. 2B illustrates a schematic of V1 defining a path from the ship to the railhead, in accordance with some embodiments.

Once one or more V2V or V2X (e.g., vehicle-to-infrastructure or the cloud) links are established, V1 can begin navigating a path from the ship to the railhead, as shown in FIG. 2B. Unlike in the previous example, however, in this case V2 remains at the cargo ship to continue loading at the ship, while V1 proceeds on its path. However, V1 and V2 remain in V2V communication, and V1 continues to communicate path information to V2. As before, the path information may be transmitted from V1 to V2 periodically, illustrated by small circles positioned along the path.

Figure 2C:
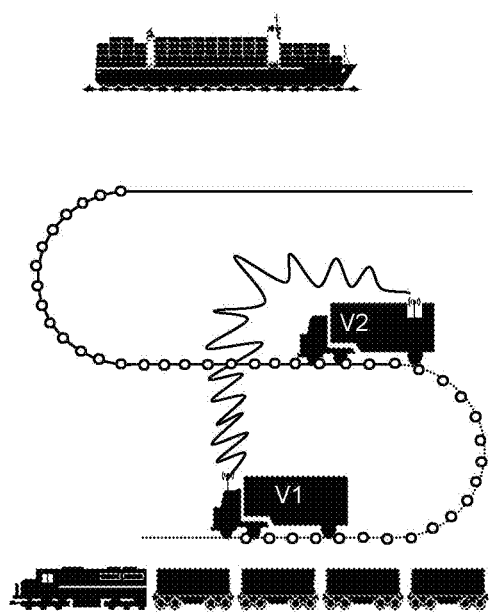
FIG. 2C illustrates a schematic of V2 following the path received from V1, while V1 arrives at the railhead, in accordance with some embodiments.

In FIG. 2C, V1 and V2 are still in V2V contact, and V2 is following along the path previously taken by V1.

Figure 2D:
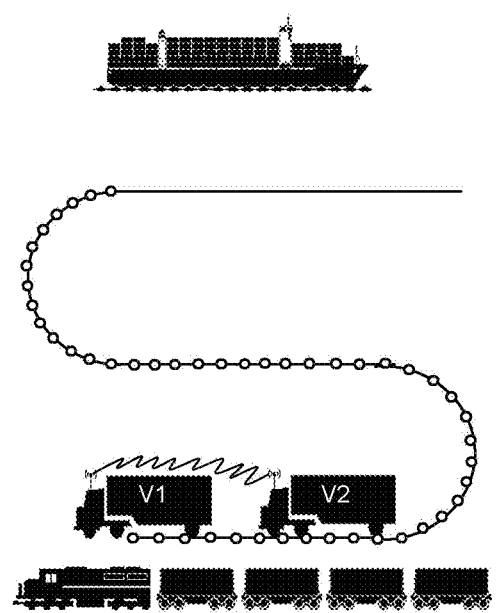
FIG. 2D illustrates a schematic of V2 arriving at the railhead, in accordance with some embodiments.

In FIG. 2D, V1 and V2 have both arrived at the railhead and are both ready to unload their cargo to the waiting train.

IV. An Example System Embodiment

Figure 3:
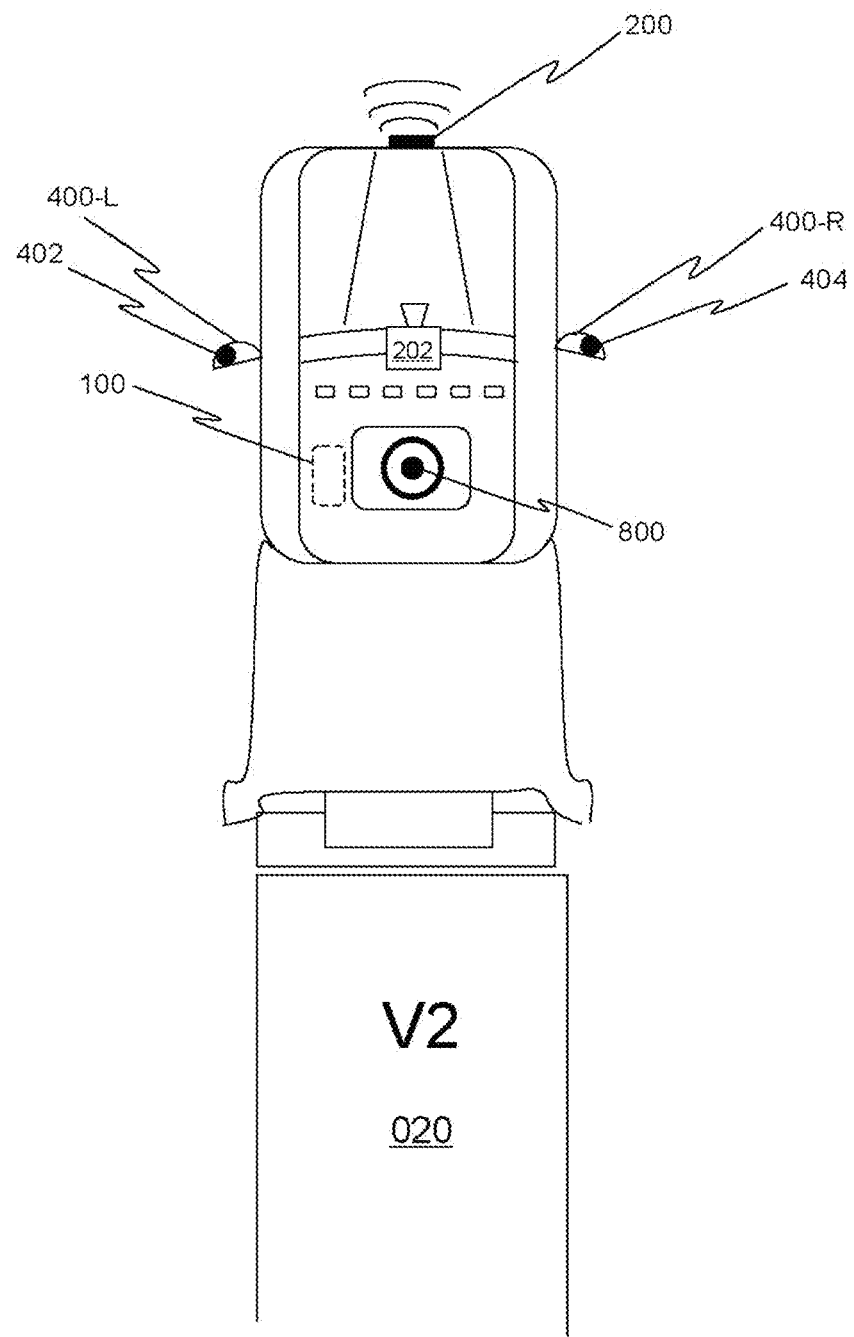
FIG. 3 illustrates a top view of a vehicle (a tractor-trailer truck) outfitted with an embodiment of a system, in accordance with some embodiments.
Figure 4:
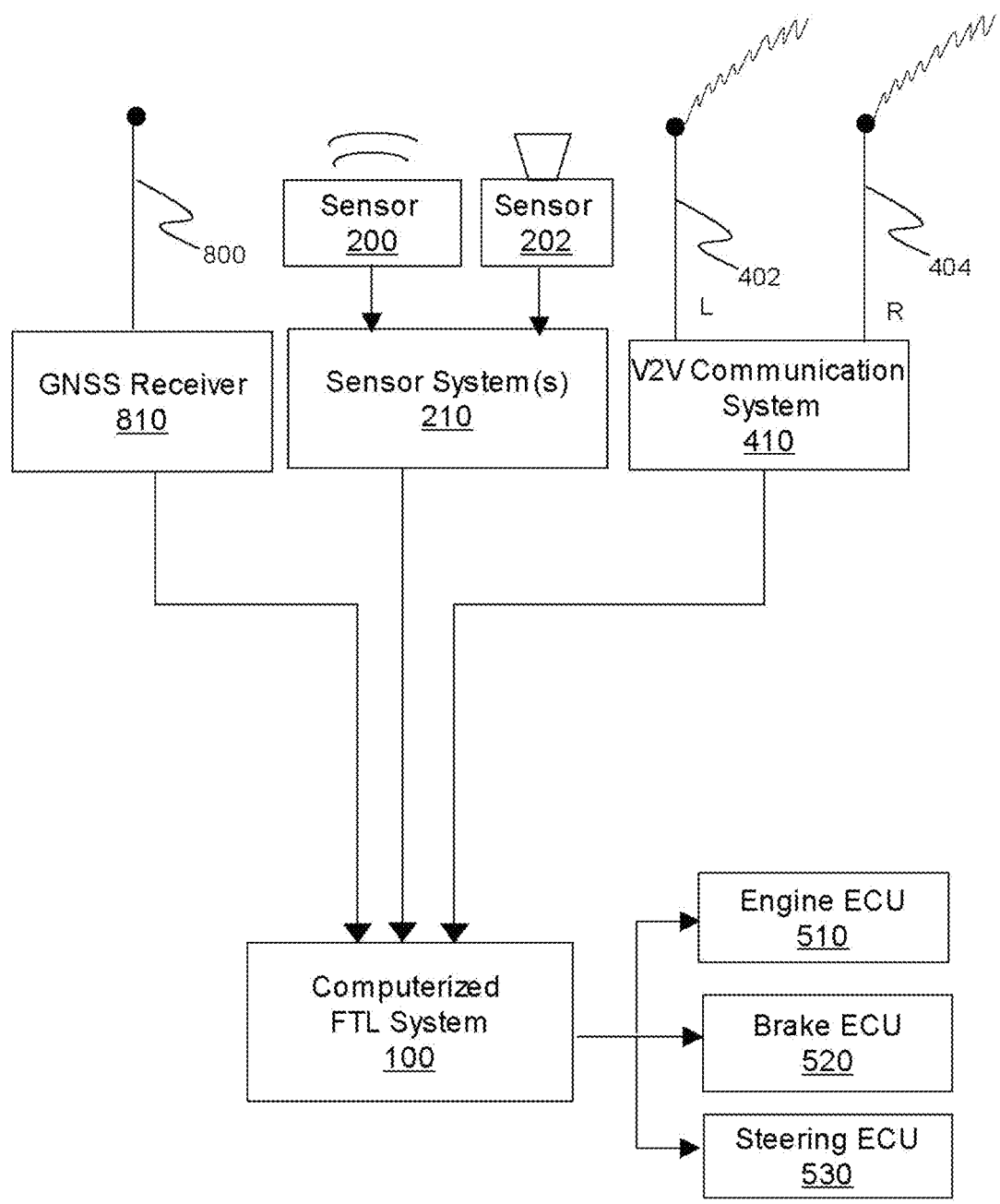
FIG. 4 illustrates a schematic diagram of some of the components of an embodiment of a system, in accordance with some embodiments.
Figure 5:
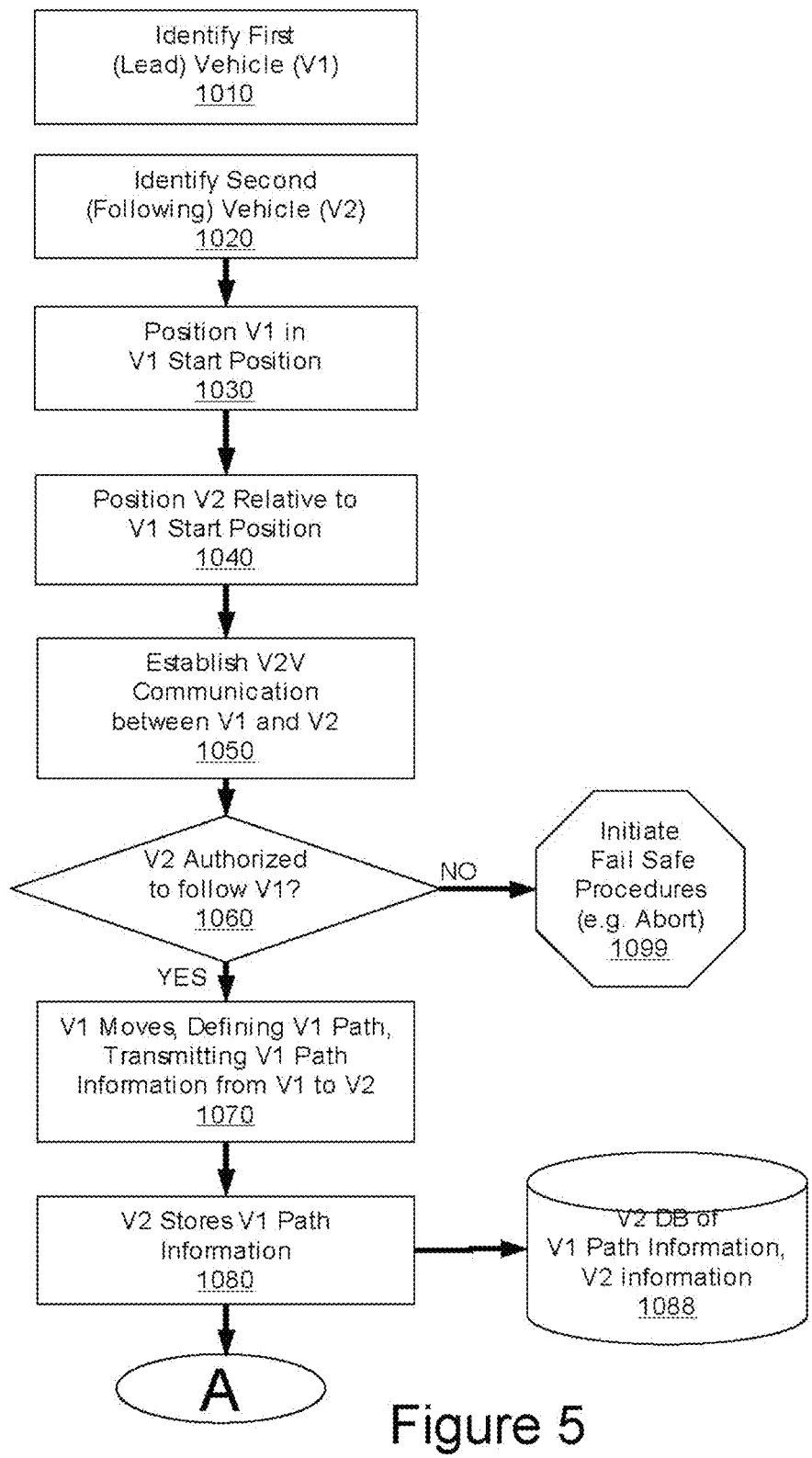
FIG. 5 illustrates a flowchart of a sequence of steps used in bringing vehicles together, in accordance with some embodiments.

To enable the example of FIGS. 1A-1D or FIG. 2A-2D, the FTL system for the following vehicle V2 020 will typically have the components of the embodiment as illustrated in FIG. 3 and schematically illustrated in FIG. 4.

In FIGS. 3 and 4, the computerized FTL system 100 comprises a computational unit, typically one or more of microprocessing units (MPUs), central processing units (CPUs), and/or graphical processing units (GPUs), along with any associated memory, storage, and input/output management. In some embodiments, the computerized FTL system 100 may comprise a multi-chip and/or multi-ECU architecture, comprising a gateway (which may be or comprise a chip) to manage communications, a system controller to manage computation of vehicle commands, and an additional safety monitor to verify that all commands for the vehicle follow certain predefined rules. Such a multi-chip architecture for platooning has been described in more detail in US patent applications such as U.S. Ser. Nos. 15/860,024, 15/860,333, and 15/860,450, all filed Jan. 2, 2018, and which are hereby incorporated by reference in their entirety.

In some embodiments, a computerized FTL system 100 may be connected to a receiver 810 for a global navigation satellite system (GNSS), such as the American Global Positioning System (GPS), with an antenna 800 configured to detect signals from one or more GNSS satellites. As illustrated in FIG. 3, the antenna may be placed over the cab of a tractor-trailer truck, but other positions on a vehicle may also be used. The Receiver 810 will typically receive the satellite signals and process them to produce a set of coordinates (e.g. longitude and latitude) corresponding to the position of the antenna, as well as velocities (e.g. easting and northing) and potentially other values corresponding to the movement of the antenna. These can then be used by the computerized FTL system 100 in determining position, either by retaining the raw coordinates, or by converting the coordinates to corresponding relative or absolute navigation information (e.g., from 36.25547 N, 120.24488 W to 5.0 m to rear, 2.4 m to left or to CA I-5 S, Mile 334.4, right-hand lane, 0.1 m to left of centerline). The navigation may be based on stored internal map data, signals transmitted remotely to the vehicle from either "smart" milemarkers on the highway (for example by using the V2V communication system for vehicle-to-infrastructure communications, V2I), or from a remote operations center monitoring the progress of the vehicle through various telematic or cellular connections. It is further contemplated that one or more vehicles may share location data received from one or more base stations (e.g., stationary data relays) and/or another vehicle via V2V. Moreover, one or more vehicles may share the location and/or IDs of one or more GNSS satellites based on attributes associated with the satellites and/or vehicles such as vehicle location, satellite location, signal strength, vehicle surroundings, etc.

The computerized FTL system 100 will typically be connected to one or more sensor systems 210 to detect the environment around the vehicle. The sensor system 210 may be connected to one or more sensors 200, 202, etc. and use one or multiple inputs from the sensor(s) to provide interpreted information about the environment to the computerized FTL system 100.

One sensor 200 may comprise a radar system, which sends out radio frequency (RF) radiation, and detects the returning echo to allow determination of the distance and relative position (sometimes referred to as azimuth or horizontal angle) to various nearby objects to be interpreted. Other information, such as Doppler shift or strength in the returning signals, may additionally be used to interpret the reflectivity and/or the relative speeds and/or accelerations and/or decelerations of the nearby objects. Radar sensors may be one or more of several different types, examples of which include pulsed, continuous wave, phased array, scanning, solid-state, 24 GHz, 77 GHz, millimeter-wave, or meta-material. The sensor system 210 may additionally be connected to a lidar system (not shown), which sends out visible or infrared radiation from a laser, and similar to radar detects the returning reflections to allow determination of the distance and relative position to various nearby objects to be interpreted. Also similar to radar, other information in the returning signals may additionally be used to interpret information about nearby objects, including its reflectivity, relative speeds, accelerations, decelerations, and temperatures. Lidar sensors may be one or more of several different types, examples of which include pulsed, continuous wave, phased array, scanning, spinning, mechanical, solid-state, MEMS, 905 nm, 1550 nm, or flash. Other sensors 202 may include, but are not limited to: additional radar and lidar sensors, monocular or stereo camera systems, pairs of RF beams, ultrasonic sensors, event-based cameras, accelerometers, gyrometers, wheelspeed sensors, suspension deflection sensors, steer angle sensors, torque sensors, temperature sensors. Additionally, some sensors may combine one or more of the aforementioned technologies into a single sensor, as an example a sensor that is a combination of a camera and a lidar. Camera systems may take visual (or infrared) images of the surrounding environment. Image processing algorithms in the sensor system(s) 210 may be used to analyze the data to interpret signals detected by the camera as various objects (e.g. road lanes, overpasses, other vehicles, vehicle identification marks, etc.). Pairs of RF beams with different frequencies may also be used on the lead vehicle, one on each side, allowing the following vehicle to center itself behind the lead vehicle by comparing the relative RF signal strengths. Additional environmental sensors may that may be known to those skilled in the art may also be combined with the sensors previously discussed to also provide inputs to the sensor system(s) 210. Moreover, sensor fusion systems may be included in an FTL system to combine data received from the various sensors. For example, a vehicle may collect data from both a camera and a radar. In some embodiments the data from the camera and the radar may be fused (e.g., combined in a useful manner) at sensor system 210. Similarly, in some embodiments data from various sensors may be fused at a central location such as Computerized FTL System 100. In some embodiments, sensor system 210 and/or V2V communication system 410 may receive sensor data from one or more other vehicles. For example, a vehicle at the front of a convoy may receive data (e.g., camera data, LIDAR data) collected by a vehicle at the rear of a convoy. Similarly, every vehicle in a convoy may be capable of collecting data using their respective sensors. This data collected by one or more vehicles may be fused with sensor data from one or more other vehicles to allow the one or more vehicles to more accurately determine their surroundings. Thus, a rear vehicle may have more information associated with the area in front of a lead vehicle. Similarly, a vehicle in the middle of a convoy may better determine information associated with the area in front of a front vehicle and behind a rear vehicle. Moreover still, if a vehicle were to cut-in to the convoy, every vehicle in the convoy may receive information associated with the cut-in based on information collected by vehicles surrounding the cut-in. Accordingly, by sharing information via V2V communications and/or another wireless method, vehicles in a convoy may receive information associated with a convoy and/or their physical settings that they would not otherwise receive, and in some embodiments may base their operations and/or maneuvers on information received from one or more other vehicles. Further augmenting the information available, the system could make use of previous data collected from previous traversals along or near the path.

In some embodiments, it is contemplated that, when a vehicle or other road user cuts into a convoy (e.g., goes in between two vehicles engaged in platooning and/or FTL), the cut in vehicle may be controlled fully or partially and/or informed by the FTL system. This may help prevent the FTLing vehicles from dissolving (e.g., the vehicles that are engaged in FTL would not end the FTL session). The FTLing vehicles may, in some cases, control one or more cut in vehicles until those vehicles are no longer between the FTL vehicles. Of course, the vehicles in the middle of the FTL vehicles may be considered as part of the FTL system too, in some embodiments, since they are at least in part controlled by other vehicles that are part of an FTL system.

In some embodiments, vehicles that cut in may receive a notice indicating that they should not be between two vehicles that are FTLing. For example, a notification may be provided to the cut in vehicle and shown on a display, a notification may be shown on the rear of a front vehicle in an FTL configuration (e.g., on the back of a trailer), smoke or another substance may be emitted from a lead vehicle, sound could be used to communicate the awareness of the cut in vehicle, lighting patterns could be altered to indicate to other road users what the FTLing vehicles observe in response to the cut in vehicle, etc.). In some embodiments, FTL systems, including systems that determine when and where vehicles that engage in FTL should travel, may be configured to attempt to cause the vehicles to travel at a place and time wherein the fewest cut-ins are expected to occur. Determining such places and times may occur using machine learning and/or artificial intelligence, and save considerable amounts of resources such as time and fuel.

The computerized FTL system 100 will also typically be connected to one or more V2V communication systems 410 to communicate with a lead vehicle. The V2V communication system 410 may comprise one or more antennas 402, 404 that may send and/or receive short range RF, cellular (e.g., Edge, 3G, 4G, LTE, 5G, 6G, 7G, etc.), satellite, bluetooth, DSRC, 802.11p, Zigbee, ultrasound, radar, infrared, or other signals for V2V communication. The antennas may be mounted to the side or roof of the following vehicle, attached to or hidden within side mirrors 400-L, 400-R that may be present on the vehicle, both vehicles, three or more vehicles, base stations, control rooms, inside the following vehicle, on or in one or more trailers, or some combination thereof.

In some embodiments, the computerized FTL system 100 takes the various inputs from the GNSS receiver 810, the sensor system(s) 210, and the V2V communication system 410, as well as data stored within the FTL system 100, and, using software stored on non-transient memory within the computerized FTL system 100, computes a desired position for V2, an actual position for V2, and the vehicle commands that will be needed to bring V2 from its actual position to its ideal position. In some cases, these positions and commands may be sequences, comprising past and/or present and/or future desired and actual positions. This computation may be done on one or more vehicles, or done remotely (e.g., at a NOC (which can be a distributed computing system)) and communicated to the one or more trucks through communication.

In some embodiments, FTL software may be connected to the various control and communication busses of the second vehicle (e.g. the Controller Area Network, or CAN bus, ethernet, BroadR-Reach, RS-485, FlexRay, or other specific connection to the relevant ECU) to send commands that direct actuators that control and/or command (note, that the control and command may be different in various scenarios)

second vehicle speed, acceleration (e.g. throttle, current, or torque to one or more electric motors, internal combustion engines, or hydrogen fuel cells), deceleration (e.g. torque or pressure to one or more braking actuators), steering (e.g. torque, pressure, or angle to one or more steering actuators), and other controls (e.g. suspension pressure and damper setting, turn and hazard signals, windshield wipers, horn, transmission gear, or clutch position) for the second vehicle. The vehicle commands may be sent to various electronic control units (ECUs) that are positioned to command the engine or other drivetrain equipment including transmissions or electric motors (using one or more engine ECUs (EECUs) 510, commanding, for example, engine torque or throttle), the brakes (using one or more brake ECUs (BECUs) 520, to apply the brakes or a retarder), and the vehicle steering (using one or more steering ECUs 530, commanding, for example, the torque of the steering column, or other commands directly to the front wheels of the vehicle).

When determining what operations may need to be performed by a following vehicle (to actuate any and all embodiments described herein), a system may base its determination on attributes including, but not limited to a/an: position, latitude, longitude, altitude, heading, speed, longitudinal and lateral acceleration, yaw, pitch, roll, yaw rate and acceleration, pitch rate and acceleration, roll rate and acceleration, articulation angles, articulation angle rates and accelerations, articulation pitch and roll angles, articulation pitch and roll angle rates and accelerations, relative heading or bearing (e.g., between two vehicles, a trailer and a tractor, etc.), vehicle kinematics, type of load (e.g., type of materials a vehicle is carrying), brake status, brake pressure, path history, path projection, travel plans, vehicle size, vehicle type, brake type, current operating mode (for example autonomous, assisted, limp-home, or manual), map data, traffic information, GPS augmentation information (e.g., delays from infrastructure), wheel speed, wheel torque, gross torque, net torque, wind, rain, music, video, tread depth, infotainment system, suspension, axle weight(s)/load(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, a blowout, interior lighting, exterior lighting, lighting indicating a vehicle is convoying/platooning, turn signals, hazard lights, windshield wipers, horn, retarder, anti-lock brakes (and, in some cases, their status), emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel level or pressure, current battery state of charge, next planned stop, projected miles remaining until fuel tanks or battery are empty, malfunctions, turn signals, LIDAR, radar, ultrasonic sensors, road surface, wheel angle, tire pressure, tire temperature, tire slip angle, tire vibration, cabin temperature, engine temperature, exhaust attributes (e.g., an amount of oxygen), trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle). It should be understood that these conditions/attributes may be used when determining other actions to be performed by vehicles (e.g., front or rear vehicles traveling autonomously alone, with a driver alone, in a platoon (non-FTL) mode, an FTL mode (which may be referred to as an FTL platoon mode)).

Herein, the term torque is used broadly to mean any portion of a system that may affect the torque of a vehicle, unless explicitly stated otherwise. For instance, the term torque may be used to describe, at least: (1) engine gross torque, (2) engine net torque, (3) wheel torque from an engine, and (4) wheel torque from braking. Further, each of these may include gear/transmission/shifting information, and various types of torque may be combined (e.g., wheel torque from an engine and wheel torque from braking may be combined and referred to as wheel torque).

At a high level, torque is a rotational force. An engine's gross torque, as an example, is the twisting force that an engine can produce before parasitic losses from the drivetrain (although, in some embodiments, an engine's gross torque may be an amount of force applied by pistons to a drive shaft). An engine's net torque, for example, may be the definition used by SAE standards J1349 and J2723, and may be the torque from an engine, measured at the same location as the gross torque (e.g., after the flywheel), when the engine is equipped with some or all of the parts necessary for actual engine operation (e.g., when an engine is actually installed in a vehicle). An engine's torque is transmitted through a gearbox, where it is multiplied with a gear ratio of an engaged gear, and produces a gearbox torque. It should be understood that commanding/controlling torque, as described herein, can apply to electric vehicles, including electric vehicles that may employ multispeed gearing (e.g., a transmission capable of shifting gear ratios). Next, torque can be measured at a differential, which then sends torque in multiple directions to the wheels. In some embodiments various amounts of torque are actively directed to one or more wheels (e.g., commanding/controlling torque using a differential such as a limited-slip differential). The amount of torque directed to any particular wheel/set of wheels may be determined based on attributes of a vehicle such as weight, the balance of a load, brake attributes, etc. Rotational force on a wheel may be referred to as wheel torque (e.g., when torque from an engine, retarder, or foundation brake reaches a vehicle's wheel). Wheel torque from an engine typically forces a vehicle to move forward (or backward if in reverse), or accelerate or decelerate if already in motion. However, wheel torque from a brake (e.g., a foundation brake) dampens wheel torque from an engine, and thus provides torque in an opposite direction from the engine torque. Since torque is a sum of all the individual torques acting on an object, wheel torque may be a combination of engine torque, brake torque, and/or any other torques applied.

Thus, herein, the term torque can be used to describe, at least: (1) the gross torque of an engine (e.g., the torque an engine can produce before loss from the drivetrain), (2) the net torque of an engine (e.g., the torque of an engine as it would be when installed in a vehicle including stock ignition timing, fuel delivery, exhaust systems, and accessories), (3) wheel torque (e.g., from an engine, from braking, a combination of the two), and (4) any of the torques described above with or without gear/shifting information (e.g., torque multiplied by a gear ratio or an amount of change of torque when a gear ratio changes).

In some systems, a platoon controller can (1) receive information (such as torque applied at a lead vehicle's engine) from a lead vehicle's ECUs, (2) apply a time offset to cause the rear vehicle to perform the same operation as the lead vehicle when it reaches the location that the lead vehicle was at when it performed that operation, (3) determine a difference between a target gap and a current gap, and (4) send output to the rear vehicle's ECUs such that they mimic the lead vehicle's ECUs while accounting for maintaining a gap and applying a correct time offset.

It should be appreciated that in some embodiments, a machine learning algorithm can be implemented such as a neural network (deep or shallow, which may employ a residual learning framework) and be applied instead of, or in conjunction with another algorithm described herein to solve a problem, reduce error, and increase computational efficiency. Such learning algorithms may implement a feedforward neural network (e.g., a convolutional neural network) and/or a recurrent neural network, with supervised learning, unsupervised learning, and/or reinforcement learning. In some embodiments, backpropagation may be implemented (e.g., by implementing a supervised long short-term memory recurrent neural network, or a max-pooling convolutional neural network which may run on a graphics processing unit). Moreover, in some embodiments, unsupervised learning methods may be used to improve supervised learning methods. Moreover still, in some embodiments, resources such as energy and time may be saved by including spiking neurons in a neural network (e.g., neurons in a neural network that do not fire at each propagation cycle). For example, a neural network may be trained to accomplish operations described herein with respect to automated/semi-automated platooning, and may be trained on data collected in the physical world or by with a simulator. Such a network may improve operations of the systems and methods described herein by assisting with path planning (e.g., determining an efficient path and/or what operation to perform when a potential collision event is determined). Similarly, such systems may be used to assist with localization, perception, decision making, vehicle controls, vehicle dynamics, vehicle communications, map generation, map curation, map matching, landmark seeking, landmark determining, behavior prediction, other operations described within this application, etc.

V. A Method Embodiment

With such an FTL system installed on the following vehicle V2 020, example methods for automated following as described below and illustrated in FIGS. 5-8 may be implemented.

In the first step 1010 of the example method, the first, lead vehicle V1 is identified, and in the next step 1020, the second, following vehicle V2 is identified. V1 will then be positioned at a starting position in the next step 1030, potentially using a human driver either in the vehicle or remotely connected to drive the vehicle to its start position. In the next step 1040, the second vehicle V2 is brought into position behind the first vehicle. This positioning can be achieved by having a human driver drive the second vehicle and park it behind the lead vehicle, using remote control commands for V2 through a suitable wireless system, or using at least partial if not fully automated driving. In some embodiments more than two vehicles may be included in an FTL system. In such embodiments a third vehicle may be parked behind V2 using any of the methods described above with reference to V2. This one or more additional vehicle may be directly behind, or can be in some other formation such as side-by-side, at a particular angle or angles, or other.

Once the second vehicle is positioned behind the first vehicle, in the next step 1050 a V2V communication link is established between the V1 and V2. This may be initiated by call-and-response communications over a wireless communication protocol, such as a dedicated short-range communication (DSRC) system, a cellular network, a Wi-Fi network, or other wireless protocol (including potentially through infrastructure such as cellular base stations) as described herein, and can be initiated by the first vehicle, the second vehicle, some remote presence (e.g., via an operator standing on the ground or remote terminal or algorithm enabled by the cloud), or some combination thereof. In embodiments where a third vehicle is included, again, the third vehicle may initiate a protocol in the same manner as V2 or in one of the other manners described above.

In some embodiments, the second vehicle will initiate the link by initially broadcasting a signal stating its identification and its coordinates, as well as the identification of the vehicle it intends to follow (the LeadID). The first vehicle, upon detecting this, compares the LeadID with its own identification, and if there is a match, will respond with a confirmation signal, along with its identification and coordinates.

In some embodiments, the first vehicle will initiate the link by initially broadcasting its identification and coordinates, and repeating the broadcast as it waits for a following vehicle to respond. If a second vehicle detects the identification of the vehicle it is designated to follow, it responds with a reply, stating its own identification (the FollowID) and any other information needed to establish a link, such as an authorization certification granting permission to follow the lead vehicle. Of course, in some cases a rear vehicle may include a human driver and allow a front vehicle to be controlled by it. In such a case, the front vehicle may automatically move to the front of the rear vehicle, or a driver in the rear vehicle may cause the rear vehicle to pull behind the front vehicle. Of course, in various embodiments, video or other sensor data captured by a first vehicle may be transmitted to a second vehicle such that a driver may view what is in front of the front vehicle.

Once the communication link is established, in some embodiments, the FTL system in the following vehicle then compares the inputs received from one or more sensor systems on the following vehicle (e.g. radar or LIDAR systems), and attempts to identify which of the sensed objects may correspond to the lead vehicle. Techniques for determining which sensor signals correspond to a particular other vehicle, by for example creating a virtual "bounding box" relative to the lead vehicle coordinates and looking for the sensor signals that reliably fall within that "bounding box", have been more explicitly described in references such as US patent applications U.S. Ser. Nos. 15/590,715 and 15/590,803, both filed May 9, 2017, and Ser. No. 15/605,456, filed May 25, 2017, which are hereby incorporated by reference in their entirety for all purposes. Many of these embodiments involve combining the communicated information (through V2V) with the sensed information (from one or more sensors). For example, a bounding box may be created using radar, LIDAR, or a camera, or any combination thereof, in combination with communicated wireless information.

In some embodiments, the second vehicle may be directed to use one or more of its sensors (e.g., a camera) to also identify a visual or otherwise distinguishing mark (e.g., a reflective cross or an RF beacon) on the lead vehicle to confirm its identity. The marking may comprise permanent markings on the cab of a tractor-trailer truck, quick response (QR) codes painted onto the rear of the lead vehicle, or identifiable markings held in place (e.g., using magnets) that a driver can attach to a portion of the lead vehicle visible from behind. They may also comprise LED indicators (either visible or infrared) that could additionally be modulated to provide additional communication between the lead and following vehicle. These markings and or other indicators may be used to transmit additional information about the vehicle including, but not limited to its: capabilities, governing speed, acceleration characteristics, potential yaw, type of load (e.g., type of materials a vehicle is carrying), brake status, brake pressure, vehicle size, vehicle type, brake type, wheel size, possible wheel torque, possible gross torque, possible net torque, type of automation system, type of suspension, axle weight(s)/load(s) (e.g., how a trailer is loaded), transmission type, battery, electronic throttle control, throttle pedal, brake pedal, power steering, steering linkage, relationship between steering actuators and one or more steered axles, non-steered axles, adaptive cruise control, tread, interior lighting, exterior lighting, lighting indicating a vehicle is convoying/platooning, retarder, anti-lock brakes, emergency braking, powertrain, gear ratio, wheel type, trailer length, trailer type, trailer height, amount of trailers, tractor type, tractor height, transceiver type, malfunctions, turn signals, LIDAR, radar, ultrasonic sensors, tire pressure, cabin temperature, engine temperature, exhaust attributes (e.g., an amount of oxygen), trailer interior temperature, camera, fleet of vehicles, NOC(s).

In some embodiments, the next step 1060 may involve confirming that the following vehicle is in fact authorized to follow the identified lead vehicle. This can be done using predetermined instructions previously loaded onto the FTL system 100 on the following vehicle, or by communication in real time with a local or remote authorization control center (often called a network operations center, or NOC, or a Dispatch center). If the authorization to initiate following is not received, or is ambiguous, the system can proceed to a step 1099 that executes one or more fail safe procedures as described above. A fail safe procedure may include announcing over a cellular or other wireless connection that failure to link has occurred. In some embodiments, the fail safe procedures may entail aborting the following run. In some embodiments, the fail safe procedures may result in an intervention by having, for example, a software reboot occur. In some embodiments, the fail safe procedures may result in an intervention by having, for example, a human driver board the following vehicle and troubleshoot the system, or remote intervention by the driver of the other vehicle or a remote operator or engineer. Other fail safe procedures may be developed by those skilled in the art.

Once the lead vehicle V1 and following vehicle V2 have been designated, are in close enough proximity that a V2V link between them has been established, and, in some embodiments, the following vehicle has identified one or more sensor inputs that correspond to the lead vehicle, and has also received authorization to follow the designated lead vehicle V1, automated following can begin.

In the next step 1070, the lead vehicle begins to move. While the lead vehicle moves, it detects its own changing coordinates and other information such as one or more of heading, bearing, and relative or absolute velocity, yaw, relative angle, brake pressure, path projection, travel plans, GPS augmentation information (e.g., delays from infrastructure), wheel speed, wheel torque, gross torque, net torque, suspension, axle weight(s)/load(s), transmission status (e.g., what gear the vehicle is in, what gear the vehicle was in, what gears the vehicle transferred from and to (e.g., fifth gear to fourth gear)), battery, electronic throttle control, throttle pedal, brake pedal, next planned stop, projected miles remaining until fuel tanks are empty, and malfunctions, and transmits them over the V2V link. The coordinates may be those provided by receiving signals from a satellite navigation system (e.g. a GNSS or GPS system), or be sensed from ground-based navigation guidance stations, or some other combination of detected navigation inputs. For example, coordinates generated by a vehicle other than the vehicles in the current convoy.

In the next step 1080 for some embodiments, the FTL system 100 on V2 will store the information received from V1 in a database 1088. The transmission from V1 to V2 is generally ongoing through the automated following procedure, as is the storage into the database 1088. Table I presents an example of the path information that may be communicated from V1 to V2: time information, trip sequence number, position information, and V1 speed and acceleration information. In some embodiments this data may include some or all of other pose, position, kinematics, or velocity data. In some embodiments, V2 will store this information in a database 1088, and the FTL system 100 on V2 will control the motion of V2 to match the stored sequence of V1 positions to the best of its ability.

TABLE I

Exemplary Path Information transmitted from V1 to V2.

| Time | Sequence | Latitude | Longitude | Speed (mph) | Acceleration |
|---|---|---|---|---|---|
| ... | | | | | |
| 13:48:09 | 2252 | 36.258976 | −120.247139 | 55.0 | 0 |
| 13:48:10 | 2253 | 36.257645 | −120.246262 | 55.0 | 0 |
| 13:48:11 | 2254 | 36.256436 | −120.245501 | 55.0 | 0 |
| 13:48:12 | 2255 | 36.255320 | −120.244825 | 55.0 | 0 |
| ... | | | | | |

The position information may be communicated as coordinates from a GNSS system (such as longitude, latitude, and/or elevation) or may be transformed into route information (e.g., from 36.25547 N, 120.24488 W to 5.0 m to rear, 2.4 m to left or to CA I-5 S, Mile 334.4, right-hand lane, 0.1 m to left of centerline). Other coordinate systems for navigation may also be used in some embodiments of the invention.

The lead vehicle V1 may also transmit other path information, such as information on V1's acceleration (including negative acceleration, such as braking), V1's internal commands to its engine and brakes or other drivetrain elements, V1's radar environment, and other information deemed relevant to coordinate operations over the V2V link. In some embodiments, this may also include data related to sensor systems on V1 as measured at the corresponding coordinates. The FTL system on V2 may both detect the changing V1 coordinates and path information through the V2V system, and also detect the lead vehicle motion using its own sensor system or systems.

Figure 6:
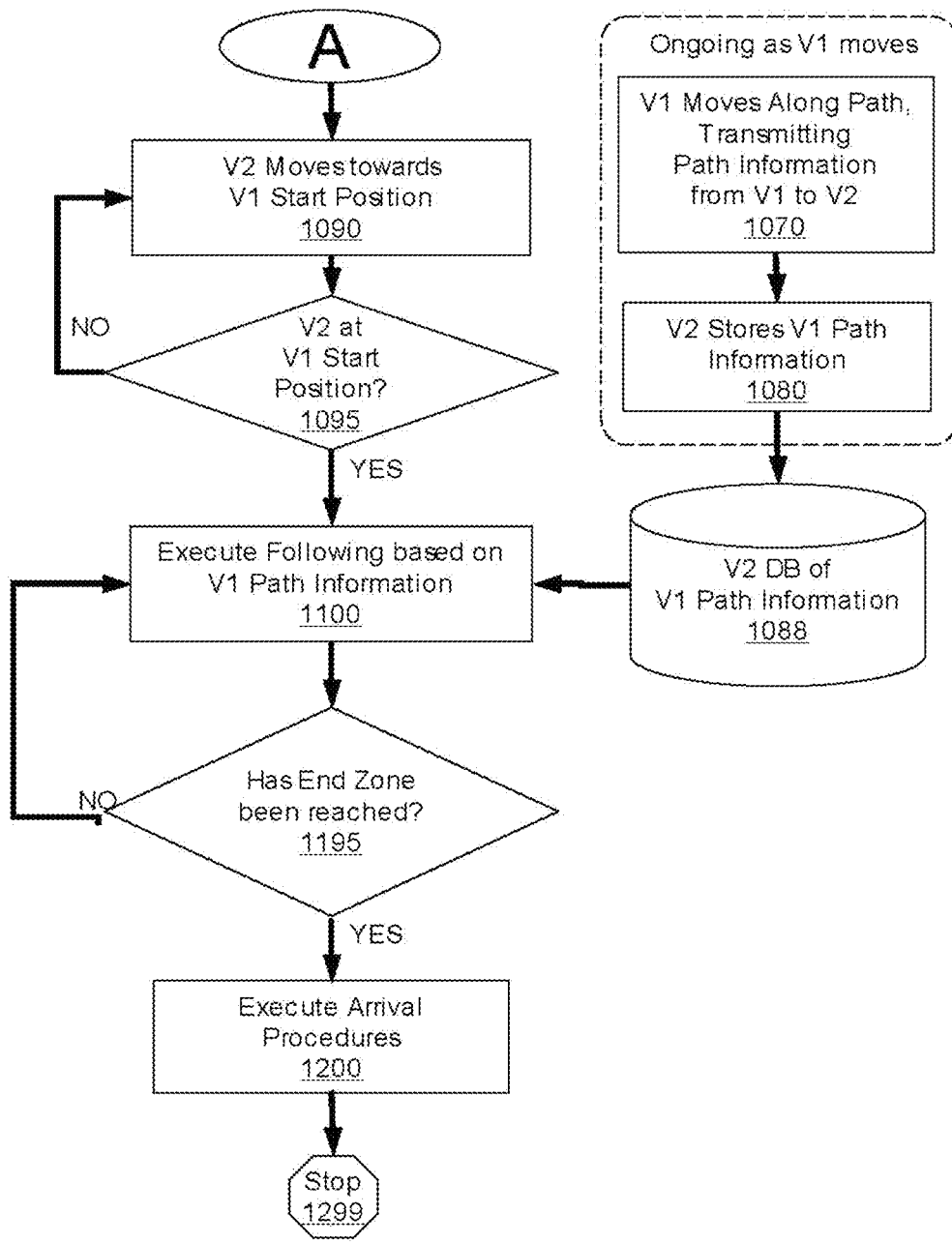
FIG. 6 illustrates a flowchart of a sequence of steps used in the automated following of two vehicles, in accordance with some embodiments.

With the accumulation of V1 path information in the database 1088, as shown in the flowchart continuation in FIG. 6, in the next step 1090 the FTL system 100 on V2 executes a sequence of vehicle commands to direct V2 to move to the point occupied by V1 as V1 initiated motion. The system makes an ongoing inquiry as to whether this point has been reached in step 1095, and, when this point is reached, in the next step 1100, the V2 FTL system 100 executes a sequence of commands that control the acceleration/deceleration, braking, torque, and steering of V2 based on the database of stored V1 path information. Although generating path information by V1 is described above, it should be understood by one skilled in the art that path information may be generated by other means. For example, path information may be generated by one or more vehicles that previously traveled on a particular path prior to V1 and V2. In such an embodiment, the path information generated by the previous vehicles (e.g., information collected by their sensors) may be used to supplement information received by V2 from V1, such as acceleration, deceleration, braking, torque, etc. Such information may be compared with to one another as a failsafe, or it may be used by V2 if V2 either cannot communicate with V1 or does not trust the information received from V1 for any other reason. This information may be also used to partially or fully automate the lead vehicle in some applications.

Further, in some embodiments, in response to any vehicle (including vehicles not part of an FTL system) becoming automated, various entertainment options may become available, such as video games, television, movies, and the like. Such entertainment options may be determined based on an estimated time it will take for a vehicle to reach its destination, a waypoint, a restaurant, etc. or the current state of the vehicles such as cargo type, safety or maintenance status, automation integrity level, weather (e.g., head, tail, or cross winds), road type and conditions, and other conditions, statuses, or attributes described herein, etc.

Figure 7:
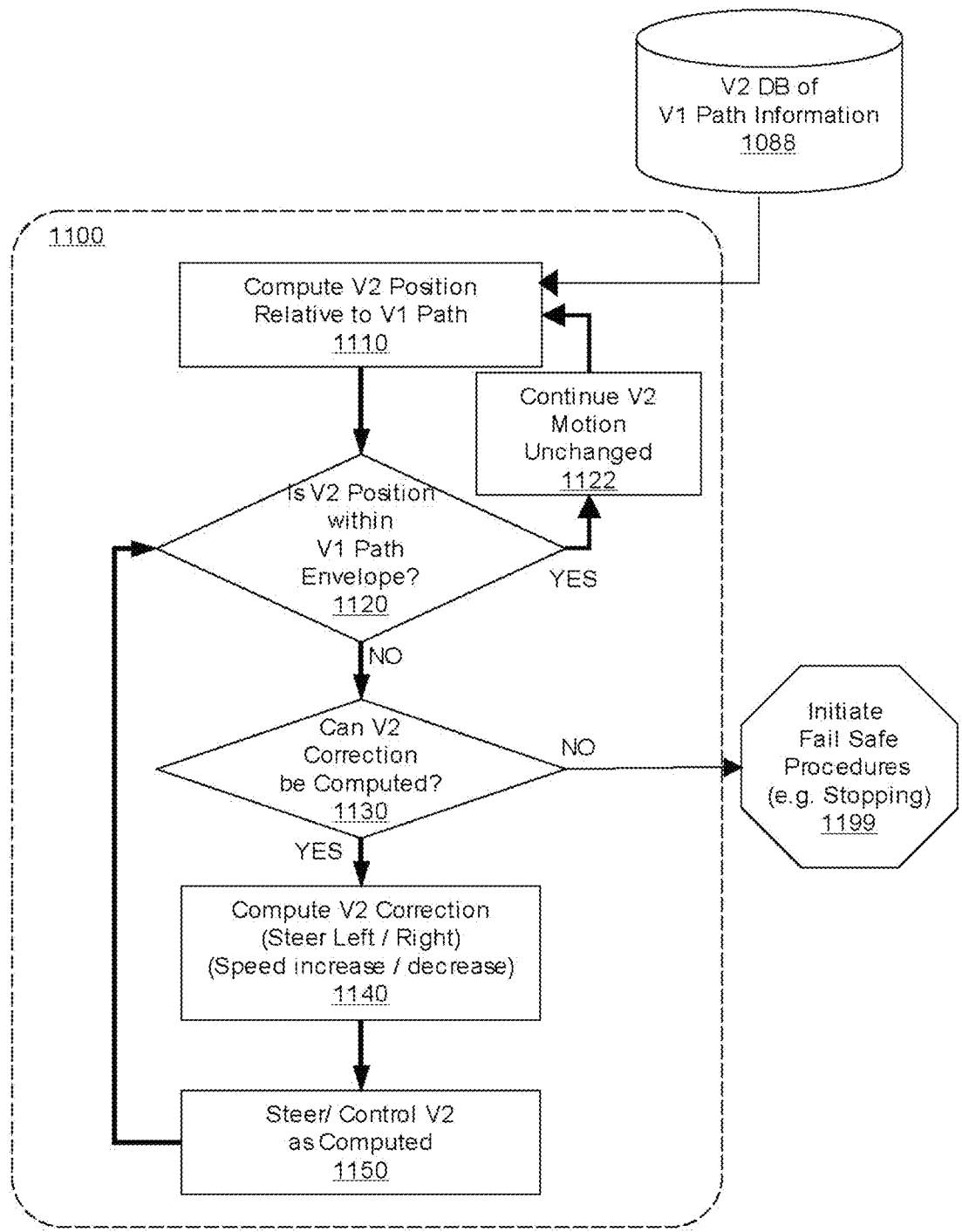
FIG. 7 illustrates a flowchart with details for one of the steps used during following, in accordance with some embodiments.

Additional detail for step 1100 as executed in some embodiments is shown in FIG. 7.

In the first step 1110 in the following sequence of FIG. 7 the FTL system reads its own coordinates using, for example, its GNSS receiver (or, if no satellites happen to be available, may determine V2's position using dead reckoning), and compares in step 1120 the determined V2 position to the coordinates from the V1 path information database 1088. If the V2 position is determined to be on the V1 path or, as discussed more below, within some empirically or algorithmically defined "path envelope" for the V1 path, in step 1122, V2 continues its motion unchanged.

If, however, the V2 position is determined to be NOT on the V1 path or, in danger of deviating from the determined V1 "path envelope", in step 1130, the magnitude of the problem/error is assessed. In various embodiments, the magnitude of the error may be assessed using a camera, LIDAR, radar, or other sensor by, for instance, determining a difference between an intended path and a current path based on road/lane markings and/or attributes of a leading vehicle such as markings.

If the error cannot be corrected at this step, the system may proceed to initiate predetermined fail safe procedures 1199, such as automatically pulling to the side of the road and stopping, providing an alert indicating that a driver should take the wheel, and/or providing an indication to a remote location wherein the vehicle can be remotely controlled, and/or other features as described herein. Other failsafe measures may include exiting FTL mode, becoming at least partially automated (e.g., fully automated), determining another vehicle to FTL with and allowing the other vehicle to control it, being controlled remotely, etc.

If the FTL system estimates that the system can be corrected at this step, the system proceeds in the next step 1140 to determine the commands needed for V2 to re-align itself to be within the "path envelope" defined by the previous passage of V1 as stored in the V2 database 1088. In the next step 1150, the commands are executed by the various ECUs on V2, as the system again reverts to step 1120, in which it determined whether the present V2 position is within the desired V1 "path envelope".

As discussed above, the motion control of the following vehicle V2 may be managed through any of a number of actuators (electronic, pneumatic, hydraulic, or other actuator type) or ECUs, including control of the second vehicle engine torque, acceleration, speed, braking, or other variables known to those skilled in the art. Actuators to automatically control the steering of the vehicle to the left or right may also be engaged, to allow the following vehicle position to overlap with the position previously occupied by the lead vehicle as it travels.

It should be clear to one skilled in the art that there are many ways to control the following vehicle relative to the stored path. Various algorithms can be used to determine the actuator commands to reach this goal.

Returning to FIG. 6, as the lead vehicle moves, it continues to transmit its identification, coordinates, or other data in both space and time over the V2V link, repeating step 1070. As the following vehicle follows, it continues to receive V1 path information in step 1080 and store that information in the database 1088. The FTL system on the following vehicle continues to execute following, repeating step 1100 by aligning the following vehicle position (through control of the steering, acceleration, braking, etc. of the following vehicle) to match the sequence of coordinates of the stored path, allowing the path taken by the following vehicle to overlap the sequence of positions previously occupied by the lead vehicle. Of course, a vehicle hauling a trailer may not always be aligned with another vehicle hauling a trailer in front of it. For example, one vehicle may fall out of alignment because it is not loaded properly (e.g., its center of gravity is not near the center causing it to take a longer amount of time to brake than a vehicle with a load near its center of gravity). In response to a vehicle being out of alignment due to its loading (e.g., axle load distribution), winds, road condition, or anything else, in addition to allowing the path taken by the following vehicle to overlap the sequence of positions previously occupied by a lead vehicle, a trailer may also overlap a sequence of positions previously occupied by a trailer attached to a lead vehicle.

The FTL system in the following vehicle may attempt to match the coordinates of the lead vehicle in space and time as closely as possible (i.e. following immediately behind the lead vehicle and maintaining a predetermined gap between vehicles, as discussed further below), or may follow later, pursuing only the same route but after some period of time has passed. It may also choose to follow the path of the lead vehicle, or alternately it can follow a path directly towards the bumper of the lead vehicle. A tolerance for errors in position may be predetermined by the system as well, allowing some deviation by a predetermined distance from the route taken by the lead vehicle (e.g., a tolerance may allow for a vehicle to be in a first position, or a second position, wherein a system does not cause an adverse reaction to the vehicle being in either condition). This predetermined distance may vary, depending on the road conditions, and environment. For example, on a straight and level road, the first vehicle may need to match the position previously occupied by the lead vehicle within the error tolerance of its sensors (e.g. a few centimeters), while a turn through a right angle at a corner may allow for larger deviations. The error tolerance of the GNSS system used by the vehicles to determine position coordinates may also be a factor in determining the position tolerances the following vehicle must use.

Interpolation between the positions transmitted from the lead vehicle may also be used to create a virtual "route" that the measured coordinates of the following vehicle must follow, without exactly matching the transmitted coordinate positions point by point.

The FTL equipment will continue to control the position of the following vehicle as it traces the path previously taken by the lead vehicle (or a previous lead vehicle, or some other source for path generation including an algorithm implemented in the cloud or a remote terminal), while monitoring to determine in step 1195 of FIG. 6 whether the end zone containing the destination has been reached. Once a predetermined end zone is reached, the system will execute programming to implement arrival procedures in the next step 1200. Once the following vehicle coordinates match the coordinates corresponding to the destination coordinates, in the last step 1299, the system will halt the following vehicle, and the automated following ends.

Figure 8:
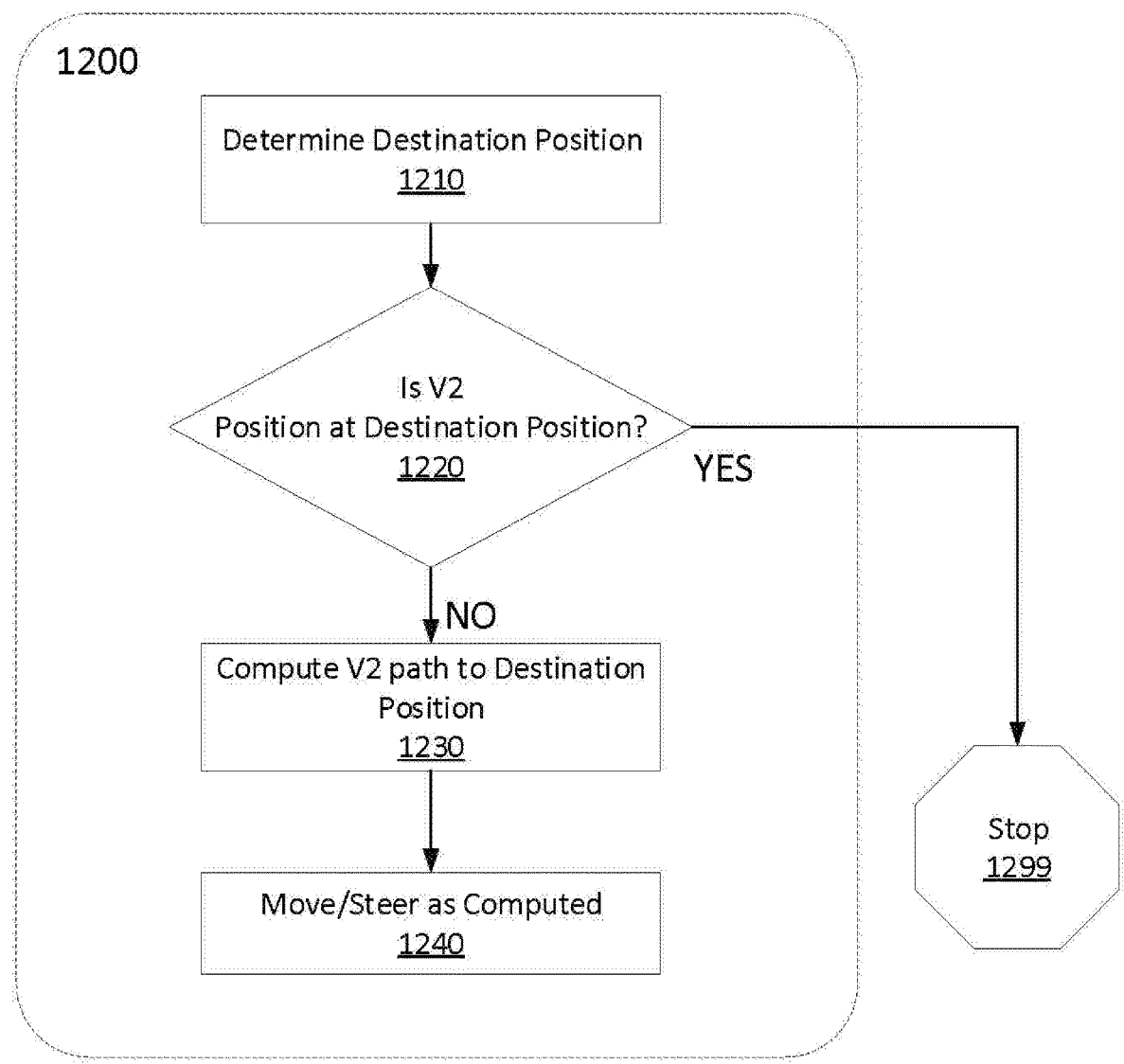
FIG. 8 illustrates a flowchart with details for one of the steps from FIG. 6 used when ending a following trip, in accordance with some embodiments.

Steps from an embodiment for certain arrival procedures (step 1200) are shown in more detail in FIG. 8.

In the first step 1210 in the example arrival sequence shown in FIG. 8, the FTL system determines its destination. The destination may be defined by coordinates, or by reference to a predetermined list stored on the FTL system, or by some other means. The statement of the destination may also have been transmitted with the original authorization in step 1060. If provided upon arrival in the end zone, the statement of the destination may be dictated by local instructions (e.g. a direction to proceed to a particular bay, or an instruction to continue to follow V1 and stop 15 feet behind the rear of V1 once V1 has stopped) received over a wireless or cellular system broadcasting within the arrival end zone.

If, as shown at step 1220, V2 determines its current position is at the destination, then the vehicle stops at step 1299. A vehicle may determine that its current position is the destination by determining that the coordinates representing V2's current position are the same as, or substantially close to, coordinates representing the destination. In some embodiments, a user or a NOC may determine that V2's current position is at the destination, in such a case a user (e.g., driver, operator at a remote terminal, person on the ground, algorithm, etc.) may perform an action such as pressing a button (e.g., on a display) or otherwise providing input to a system, or a NOC may send a notification (e.g., to a driver via a display, or the system on board the vehicle to automatically stop).

If, however, V2 determines it is not at its destination, in the next step 1230 a path to navigate to that destination is computed, and, if all sensors and/or the end zone management authorize the conclusion of vehicle motion (assuming no obstacles detected), the FTL system on V2 controls the position of V2 in step 1240 as it plots a route to the final destination. This path may also simply be following the path previously taken by the lead vehicle, or it may be a path determined by local circumstances and traffic conditions. V2 continues to navigate as in step 1220 until the destination is reached.

VI. Additional Control Variations.

As the system continues to actuate the steering of the system as best it can to match the coordinates previously occupied by the lead vehicle, as described in example embodiments herein, several additional systems may be executed to insure that the automated following occurs safely.

VI.1 Gap Control

In one or more embodiments, in response to the FTL system in the following vehicle has identified a sensor signal (e.g. a radar point or points) as corresponding to the lead vehicle, software systems running within the FTL system can monitor the distance from V2 to the lead vehicle V1 (the gap to the lead vehicle) and control the speed and position of V2 so that it not only follows a path designated by the lead vehicle, but it also controls the gap between the lead and following vehicles to be a predetermined amount.

As described above, in some embodiments, gap control may be accomplished by commanding an amount of torque (e.g., gross torque, net torque, wheel torque from an engine, wheel torque from braking). For example, lead vehicle V1's components may generate information which may, or may not, be shared on a CAN bus already present in the base vehicle. Or, for reasons of bandwidth availability, latency, or other network performance characteristics, this could be transmitted on a separate CAN or other network specific to FTL.

However, if a platooning system were able to gather additional data from a lead vehicle's ECUs (e.g., an engine ECU (EECU), brake ECU (BECU), and engine brake/retarder ECU (RECU), chassis ECU, suspension ECU, transmission ECU (TECU)) and send that data to a rear vehicle's engine ECU, brake ECU, and retarder ECU, then the rear vehicle could react quicker and more precisely than current platooning systems as described above. Furthermore, an arbiter could evaluate one or more static or dynamic network performance characteristics to determine how messages flow on various networks of one or more types (e.g., CAN, ethernet, LIN, USB, etc.). The arbiter may also make decisions based on attributes of the vehicles such as make, model, year, types and versions of one or more ECUs (e.g., BECU, VECU, etc.). For example, the arbiter may identify that a given vehicle under a specific condition may be subject to decreased available bandwidth on one network, also present in the base vehicle, and decide to use another, added using the FTL system. So, for instance, V1 can send more information about road moisture or otherwise may not be able to send as quickly or reliably.

In addition, such a technique could save fuel since a platoon ECU/controller would be controlling throttle management using a feed forward model (e.g., this type of system would be predictive). For example, techniques described herein may assist in preventing a vehicle from over-shooting a target gap, and then needing to readjust to achieve the target gap (e.g., the system could command a certain amount of torque).

In some cases for some embodiments, it may be necessary to ensure the ECUs on the lead vehicle and the rear vehicle are not performing some specific operations at the same time. For example, if a lead vehicle's engine ECU commands more torque in response to driver input (e.g., an accelerator pedal), the rear vehicle's engine ECU would need to wait until it receives, estimates, or otherwise processes that information before it commands the additional torque. Or, for example, a rear vehicle may command less torque in response to a detection of an obstacle (e.g., via a radar or other sensor), which may require processing by the rear vehicle before being transmitted to, detected by, or otherwise processed by the lead vehicle before it similarly can alter its commands. Thus, a platoon ECU may require a time offset which causes operations in the rear vehicle to occur at a different time than those operations in the lead vehicle.

Accordingly, in some systems, a platoon ECU can (1) receive information (which may not otherwise typically be available) from a lead vehicle's ECUs, (2) apply a time offset to prevent the rear vehicle from performing the same operations as the lead vehicle too soon, (3) determine a difference between a target gap and a current gap (e.g., adjust for gap error), and (4) send output to the rear vehicle's ECUs such that they mimic the lead vehicle's ECUs while accounting for maintaining a gap and applying a correct time offset.

In some cases, a platoon ECU may need to account for other variables. For example, if a rear vehicle is heavier or lighter than a lead vehicle, then the platoon ECU will need to account for the difference in weight. In such a case, for example, the platoon ECU may only command the rear engine ECU to ramp up from 25% of its maximum torque to 30% of its maximum torque, even though the lead truck's engine ECU ramped up from 30% of its maximum torque to 40% of its maximum torque. In some embodiments, this may be referred to as scaling commands. In various embodiments, a platooning system or FTL system may use/access aspects of adaptive cruise control systems and/or automatic emergency braking systems already included in a vehicle to request torque and/or brake.

In some embodiments one or more parameters (e.g., precision, allowable errors, rigidity, etc.) of the control for path following is adjusted as a function of one or more dynamic conditions (e.g., the gap, vehicle speeds, weather, wind or other perturbations, potholes, traffic, etc.).

This predetermined gap amount may vary, depending on the speed of the vehicles, and the environment of the vehicles. For example, a gap of 60 feet may be desired if automated following is being carried out at 55 mph on a limited access highway, but a gap of 10 feet or less may be allowed if traveling at 5 mph or less as the vehicles begin moving at the start or end of their trip. This gap may also be chosen to reduce the frequency of vehicles cutting in between the two vehicles, for example by reducing the gap in areas of heavy traffic.

Techniques for gap control between platooning vehicles may be applied to automated following as well, and used in the software running on the FTL system. These gap control techniques have been more explicitly described in references such as the patent applications previously cited, which have been incorporated by reference, as well as U.S. Provisional Application 62/639,297, which is also hereby incorporated by reference in its entirety for all purposes.

VI.2 Speed and Acceleration/Deceleration Matching

The information transmitted by the lead vehicle to the FTL system in the following vehicle may additionally contain lead vehicle speed information. The FTL system in the following vehicle can then control the following vehicle to not only match the sequence of lead vehicle path coordinates, but to also control the following vehicle speed to match the speed that the lead vehicle had at those coordinates as well.

Likewise, the information transmitted by the lead vehicle to the FTL system in the following vehicle may additionally contain lead vehicle acceleration and/or deceleration information, or any other dynamic trajectory information derived from a time history of its positions (e.g., curvature, jerk, lateral speed, lateral acceleration, vertical speed, vertical acceleration, etc.) or orientations (e.g., angles, velocities, and accelerations of yaw, pitch, and roll). The FTL system in the following vehicle can then control the following vehicle to not only match the lead vehicle path and speed coordinates, but to also control the following vehicle acceleration, deceleration, or other dynamic trajectory information to match, track, or otherwise compensate for what the lead vehicle had at those coordinates as well.

As described above, vehicle acceleration/deceleration matching may be accomplished using a variety of methods. For example, an FTL system that controls a throttle and/or brake pedal may cause a following vehicle to match a lead vehicle's speed. In some embodiments, an FTL system (or any platooning system) may control a following vehicle's torque, brakes, retarder, suspension, chassis ECU, and/or transmission, among other vehicle attributes, to cause a rear vehicle to match a leading vehicle's speed. For example, a rear vehicle may need to actuate a transmission (e.g. change a gear ratio) such that the rear vehicle can maintain a particular amount of longitudinal force to maintain a gap (e.g. if a lead vehicle begins to travel up a grade). In some embodiments, when a gap between a following vehicle and a lead vehicle increases, a length between multiple gaps between a following vehicle and additional vehicles platooning behind the following vehicle may increase, causing the length of the total platoon to grow (e.g. the length of the platoon may be exacerbated by each increase in each gap).

In some embodiments, these techniques to match speed/acceleration/deceleration or other dynamic trajectory information may be used in cases where the following vehicle departs at a time after the lead vehicle has already departed, or has lost the sensor signal detecting the lead vehicle, but is still receiving communications from the lead vehicle through the V2V link.

VI.3 Envelope Matching

Figure 9:
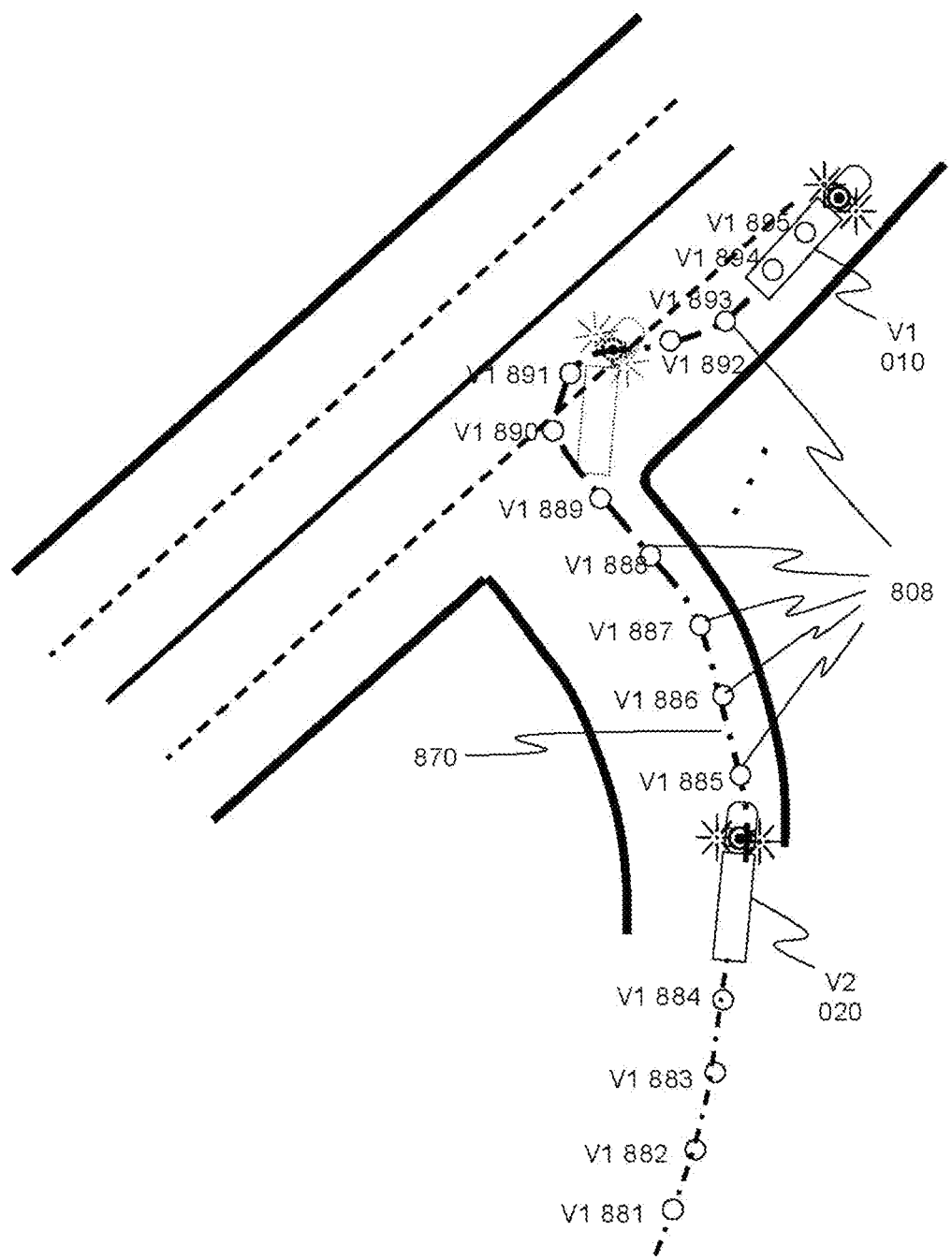
FIG. 9 illustrates a path defined by a tractor-trailer truck as it goes around a right-angle turn, in accordance with some embodiments.

As described above, the lead vehicle may transmit a sequence of its position coordinates as it follows its route. The FTL system in the following vehicle may direct the following vehicle to match a sequence of coordinates derived from these positions at a later point in time. Such an example is illustrated in FIG. 9, in which the positions along a path 870 at which V1 transmits information 808 are marked by small circles and numbers with "V1" and a position serial number. As depicted in FIG. 9, the sequence of path information points identify V1 positions and information at periodic distances along the path; however, as depicted previously (e.g. in Table I), these may be transmitted periodically in time (e.g. every second, or at 10 Hz, or at some other frequency) or at some other combination of time and space events.

As depicted in the example in FIG. 9, V1 has approached an intersection and turned right. As shown, V1 is a tractor-trailer truck, and as it has turned around the corner onto a wider street, the length of the vehicle requires that the cab extend into the second lane of the wider street to execute the turn. The position occupied by the tractor-trailer truck as it rounded the corner is shown as a truck in dotted outline.

The path information from V1 may typically reflect an actual path V1 has taken, and V2, depicted in FIG. 9 as a tractor-trailer truck as well, may also follow exactly the same path. However, if V2 is a vehicle with a different configuration (e.g. a van instead of a tractor-trailer) or operating at a higher speed or acceleration, the extension into the intersection may not need to be as extreme. Similarly, if V2 includes two trailers and/or has a longer length than V1 or is operating at a lower speed or acceleration, the extension into the intersection may be less. Algorithms within the FTL software may be designed with inputs that account for the length, size, mass of the vehicles, height, wheelbase, or other geometric and/or kinematic attributes, and adjust the guidance for V2 to compensate for differences between the two vehicles. This consideration of the difference between the two vehicles may be on a lead vehicle (for example through transmitting a different set of path information), may be on a following vehicle (for example by interpreting the path differently to calculate a different resulting follow truck path), or may be on a third vehicle or other network-connected computer.

Figure 10:
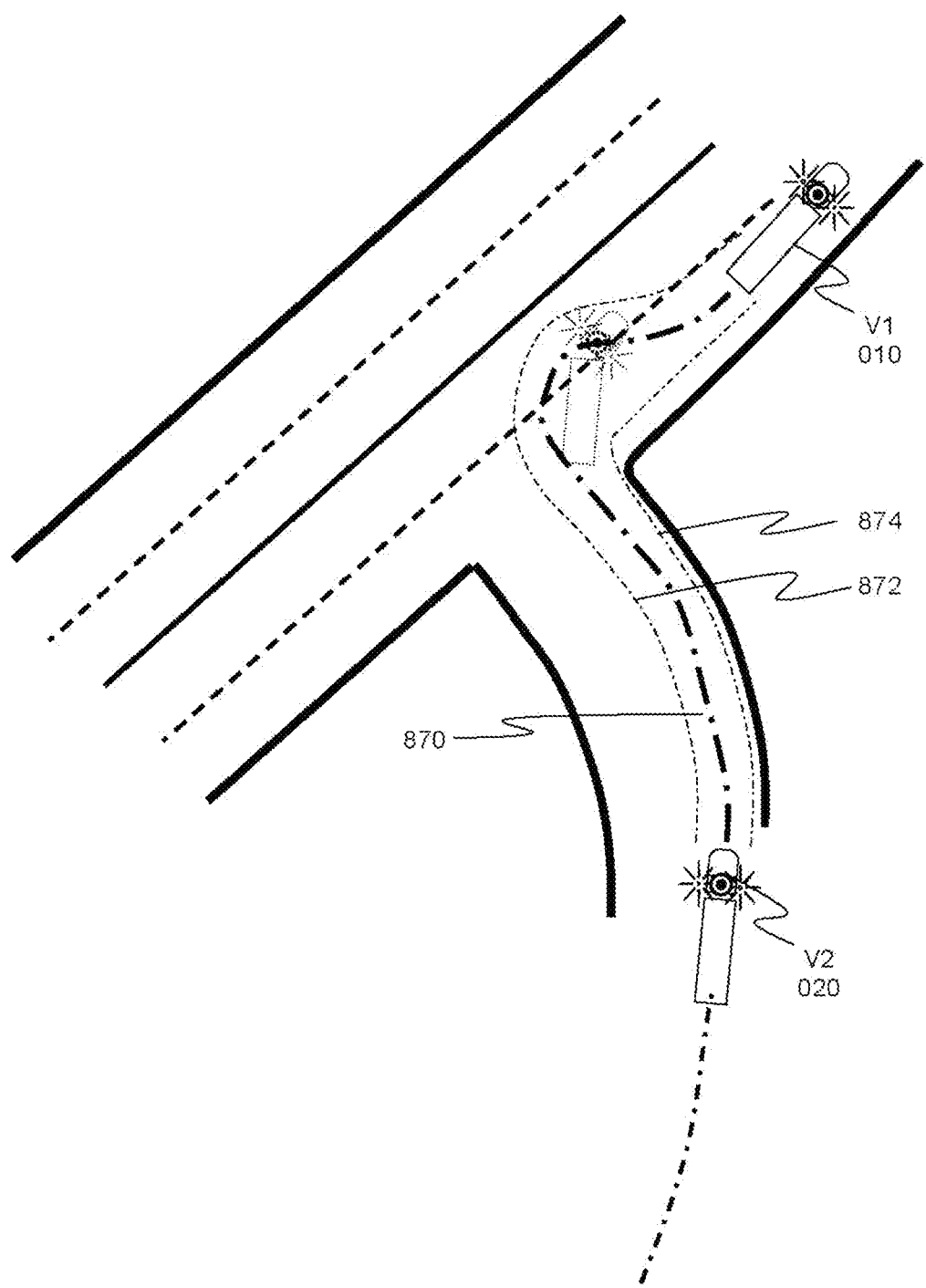
FIG. 10 illustrates the path of FIG. 9 with an associated path "envelope", in accordance with some embodiments.

Rather than just match position coordinates as exactly/best as possible, an FTL system on the leading and/or following vehicle may instead compute an "envelope" of information, designating a boundary zone around the lead vehicle path, in which the following vehicle may still be considered to be "following" the lead vehicle. Such an envelope for the path of FIG. 9 is illustrated in FIG. 10. For the path 860 taken by V1, a left edge 862 and a right edge 864 to an envelope along the path 860 are shown. As depicted, the envelope traces/depicts the entire space occupied by any point of V1, including the trailers, as the vehicle turns the corner.

Embodiments may have many possible variants of the "envelope". The "envelope" may be a simple "bounding box" swept out by the lead vehicle as it moves through space, with anything within the bounding box being an allowed position. Or, this "envelope" may be a more complex function (e.g. a error function calculated relative to the lead vehicle path), so that the value of the function at a given coordinate position would dictate a degree of deviation from the ideal path. Larger deviations could indicate the need for a stronger correction action on the part of the following vehicle. Likewise, zones within the "envelope" could indicate that following is "good enough" (e.g. a deviation by half a meter may not be an "exact" match to the lead vehicle position, but may require no correction as long as the following vehicle remains within the same highway lane that the lead vehicle took). Likewise, deviations by a full lane may also be allowed in some embodiments, as long as suitable equipment to manage additional hazards that V2 will experience in the neighboring lane are also provided. For example, V2 may change lanes in response to a vehicle encroaching as it enters onto a freeway. In such an embodiment, V2 may be configured to stay with the platoon (e.g. not dissolve/end the platoon) if it is able to rejoin the lane V1 is in within a certain period of time (e.g. a predetermined period of time). Further, V2 may be configured to avoid obstacles within a neighboring lane such as other vehicles or road obstacles. Such avoidance may be accomplished using radar, lidar, a camera, and other techniques used by autonomous vehicles that are not using an FTL system.

In some embodiments, an envelope may be augmented. For example, after an envelope is created based on a first vehicle, the envelope may change. For example, it may be augmented if a sensor detects that conditions within, or external to, an envelope have changed. E.g., an obstacle may enter the envelope such as a passenger vehicle or a pedestrian. In some embodiments, an envelope may be augmented based on whether an envelope is acceptable to a system. For example, a first vehicle may bump into or run over a curb or divider, which may cause a system to calculate a safe operating envelope that is smaller than the one in which the first vehicle traveled. Of course, in some embodiments, an envelope may be enlarged (e.g., because sensors included in a vehicle or remote from vehicles may determine a path outside of the envelope is safe to travel in). In some cases, if an envelope is augmented (e.g., made smaller due to a pedestrian entering the envelope), a system may determine whether an envelope may be enlarged such that a second vehicle can travel safely, and/or a system may determine whether a vehicle should travel on another route.

In some embodiments, it is contemplated that passenger vehicles, or other objects (e.g., a base station or other type of infrastructure) that include sensors may provide information to assist with the creation of an envelope.

In some embodiments, the rules for envelope formation may be quite different, depending on the highway type, environment, road conditions, weather, etc. On dirt roads in a remote mining site, deviation from following an exact path may be easily allowed since there are few obstacles, or ruts in an unpaved road could mandate a very strict following policy. On highways in urban areas with traffic, strict adherence to traffic lanes may be required, or precise calculation of infrastructure could allow a looser following (e.g. the vehicle could be permitted to deviate from the precise path provided it stays in the lane).

Envelopes may be calculated by the FTL system on the following vehicle, based on a set of predetermined rules, algorithms, and the coordinates transmitted from the lead vehicle. An "envelope" may also be generated on the lead vehicle, and transmitted as additional information to the following vehicle. An "envelope" may also be generated on a remote operations center (e.g. at a NOC), and transmitted as additional information to the following vehicle. Specific implementations for specific applications may dictate which is the more efficient use of computing resources.

As an example, an envelope may be created based at least in part on attributes of a lead vehicle. For instance, an FTL system may determine/receive various attributes of a lead vehicle such as its length, width, center of gravity, turn radius, etc. Based on these attributes, in addition to a lead vehicle's speed, steering wheel angle, speed/acceleration of a turning steering wheel, drive wheel angle, speed/acceleration of a changing drive wheel angle, and/or its yaw rate, an "envelope" may be generated (e.g. left edge 862 and right edge 864 may be generated). In other words, since the dimensions of a vehicle are known, an envelope may be determined based on a vehicle's trajectory and speed (which can be determined based on steering wheel positions, for instance).

Further, in some embodiments, it is contemplated that a following vehicle's components may assist with determining a lead vehicle's envelope. For instance, a following vehicle may assist an FTL system with determining a lead vehicle's envelope based on input from the following vehicle's camera(s), LIDAR, radar, etc. In such an embodiment, it is contemplated that a lead vehicle's edges or other points may be tracked (or bound) and used to create left edge 862 and right edge 864. In some embodiments, a combination of data gathered by a lead vehicle and a following vehicle may be combined to determine left edge 862 and right edge 864. In some embodiments, these sources of information may be further augmented by infrastructure (e.g. cameras mounted at intersections) or other vehicles (e.g. a passing car identifying itself using V2V communication).

VI.4 Sensor and Kinematics Matching

As described above, in some embodiments the lead vehicle transmits a sequence of its position coordinates as it follows its route. The lead vehicle may also transmit an envelope to accompany these coordinates.

In some embodiments, data regarding the orientation of the vehicle, as well as data about the local environment, may also be collected and transmitted over the V2V link to the following vehicle. This "log information" may be collected sensor signals (e.g. bearing vs. heading information; articulation data for vehicles such as tractor trailer trucks that pivot as they round bends or corners; radar, LIDAR or camera input from the surroundings; vertical acceleration data from potholes; tire vibration noise from pavement textures, etc.) that collectively form a "signature" experienced by the lead vehicle as it follows its route. This "log information" may be transmitted from the lead vehicle and received by the FTL system on the following vehicle, and may be stored in the FTL system along with, or as part of, the lead vehicle path information.

In one or more embodiments, when the sensors on the lead vehicle and the following vehicle are matched (e.g. both have similar radar systems, both have similar vertical acceleration detectors, etc.) then the FTL system on the following vehicle can compare its own sensor inputs to the corresponding stored "log information" when it passes by the corresponding coordinate position. If there is a mismatch between the real data the following vehicle detects in its environment with the signals expected from reading stored the lead vehicle information, then the discrepancy can be logged. If there are too many discrepancies, or too many in rapid succession, then a determination may be made that the following truck is not physically following the same route, even though the coordinates may seem to match. The following vehicle can then transmit an alert, and change its operating behavior (e.g. in some cases slow or stop until the discrepancy is resolved, or continue following a lane without using information from the lead vehicle for a given duration of time).

For example, if the lead vehicle transmits that its radar detected a static object (e.g. a road sign) to the right of the road at coordinates (e.g. 37.411 N, −122.076 W), along with an indication that a vertical accelerometer detected a bump in the pavement, but the following vehicle detect no object and no change in the pavement, it can send a discrepancy signal to the driver in the lead vehicle. If the next "signature" element is also missed, then an alert can be sent to the driver in the lead vehicle, as the following vehicle executes a predetermined emergency protocol, such as decelerating, pulling to the side of the road and stopping. The lead driver or another vehicle with an FTL system can then circle back to find the following vehicle, reestablish the communication link, reset the path stored in the following vehicle, and resume the trip.

As another example, various perception, localization, and mapping techniques may be employed by an FTL system. For example, one or more vehicles in a platoon may receive a highly-automated driving or high definition map (also known as an HAD map or HD map). In some embodiments a vehicle may use a HAD Map for localization. For example, a vehicle may receive a HAD map (e.g., from a NOC, another vehicle, a configuration file) and determine its location based on that HAD map.

In some embodiments, a vehicle may compare information received from various sensors with information from a HAD map to determine its location. For example, a vehicle may use lidar, camera, radar, and/or ultrasonic sensors (and/or a GPS receiver) to create a depiction (e.g., a point cloud) of its surroundings. By comparing that point cloud with information included in an HAD map, a vehicle may determine its location—in many cases more precisely than the vehicle could using GPS.

With regard to platooning, in some embodiments a plurality of vehicles may share information collected from their sensors to determine their location. For example, a following vehicle may not be able to determine what is in front of a leading vehicle using its radar/LIDAR/camera. Similarly, a leading vehicle may not be able to determine what is behind a following vehicle with its sensors (let alone what is behind a vehicle that is following the following vehicle). As such, it may be beneficial for two or more vehicles in a platoon to communicate data with each other, an FTL system, and/or a NOC.

In some embodiments, vehicles in a platoon may share information (e.g., raw sensor data, processed data, fused sensor data, planned paths, routes, decision making information, vehicle attributes) with one another. The vehicles may share this information wirelessly (e.g., through antennas which may be contained within one or more mirrors of a vehicle). They may also share this information with a NOC or data processing center remote from the vehicles. In any case, by receiving this information a vehicle within a platoon may receive a greater amount of information (e.g., about what other trucks were sensing and planning) than if the vehicle were not able to communicate information with other vehicles.

Further, it is contemplated that in some embodiments techniques such as simultaneous location and mapping (SLAM) may be utilized to improve the performance of an FTL system. SLAM is a computational technique that constructs or updates a map of a known or unknown environment while simultaneously keeping track of a vehicle's location within the environment. Popular methods for employing SLAM methods include particle filters, (extended) Kalman filters, and GraphSLAM—all of which may be implemented in the various systems and methods described herein.

While maps may be provided by various mapping companies, it is contemplated that mapping companies may not update certain roads or highways as frequently as would be desired. For example, vehicles that travel through Alaska and parts of Canada may not be able to access the most recent maps. Further, terrain may change frequently in some environments necessitating up-to-date maps. As such, in various embodiments, vehicles (including those in platoons) may generate and/or update maps as they travel across various roads and terrain. Such terrain may include non-public roads, mines, construction sites, ice roads (e.g., Ice Road Truckers), etc. As maps are updated, they may be shared with other vehicles in a platoon, the cloud, a NOC, etc. Such maps may then be transmitted to one or more vehicles (including one or more vehicles in a platoon) from a NOC or other system causing the vehicles to determine their location with greater ease. In addition, in some cases one or more vehicles may determine that a received map may be incorrect in response to comparing a map with sensor inputs. In some cases, a threshold number of vehicles (e.g., platooning vehicles) may need to determine that one or maps are incorrect, based on input from their sensors, to cause those one or maps to be updated. Such an update may occur at a map repository, which may be associated with or included in a NOC.

It should be appreciated that the exact number of sensor signals transmitted may vary, and will typically not be raw, unfiltered sensor signals. Radar on the lead vehicle may detect moving objects on the road that the following vehicle, coming along later, would not detect, and so some degree of filtering to send information about only static objects detected by the lead vehicle may be required before transmission. Likewise, if the sensors are not all matched between the two vehicles, adjustment so that the initial link between the lead and following vehicles establishes what information should be shared (because sensors are both present) and what should not be shared (because one of the vehicles is missing a sensor or has a sensor miscalibrated, for example).

Bandwidth limitations of the V2V communication link may also restrict how much additional sensor information can be transmitted between the two vehicles. In some embodiments, the V2V communication link may use multi-channel antennas, so that one channel transmits high priority information (e.g. coordinate information) while another channel transmits low priority information (e.g. other sensor information, which may require higher bandwidth). In some embodiments various sensor fusion techniques may be performed to reduce latency on the communication link.

If the vehicle is following closely, the time delay between the lead vehicle encountering an environment and a following vehicle encountering the same environment may only be fractions of a second. If the system is oriented to allow automated following at a distance, around corners, or with some significant distance between the two vehicles, some time may elapse before the second vehicle encounters the same environment. In some embodiments, a time "limit" may be imposed, so only data from the lead truck within a certain time period (e.g., 10 seconds) may be considered "current", and useable by the following vehicle. In other embodiments, it may be expected that the following truck will be closely following the lead vehicle, and therefore no time "limit" may be required. In some embodiments, the uncertainty or fidelity bounds (e.g. covariance) may grow with time, not necessarily hitting a hard limit but deteriorating in precision over time.

VI.5 Minimal Risk Maneuvers (MRMs)

In one or more embodiments, the FTL system may be additionally configured with software encoding a set of minimal risk maneuvers (MRMs) in foreseeable circumstances where executing the imperative to follow the lead vehicle path is determined to be no longer safe or possible. For example, when another vehicle cuts in between the lead and following vehicles, the following vehicle may have a protocol to slow down and increase the distance to the cut-in vehicle, while still following the route previously taken by the following vehicle. Or, if sensors detect the neighboring lane is clear, the FTL system may direct the execution of a lane change to avoid tailgating behind the cut-in vehicle, even if the following vehicle would now be deviating further from the exact route previously taken by the lead vehicle when in the neighboring lane.

These MRMs may be applied automatically to the following vehicle, could be applied by the driver of the lead vehicle, automatically applied by the lead vehicle, or otherwise applied or directed by a remote computer or operator.

The set of MRMs will typically be customized, depending on the route to be followed and the traffic circumstances expected to be encountered. For example, based on a planned route/trip, only a subset of a set of MRMs may be available to one or more vehicles.

Likewise, certain routes and paths may lend themselves to different operational design domains (ODDs). For example, automated following in a remote mining operation in which multiple trucks carry ore from a mine to a railhead may allow the vehicles to be separated by larger distances, and allow larger deviations from the path as the following vehicles trace the path taken by the lead vehicle. However, in a more congested highway situation, the lead vehicle may be limited in its speed and acceleration if it is being followed by one or more vehicles. And, likewise, the gap for following may be more tightly regulated if the two vehicles need to stay closer together for additional safety. In addition, the opposite may be true in these examples: on the mining path the road may have ruts that require very precise positioning, or on the highway the lane markings may permit deviation from the exact lead vehicle trajectory provided the vehicle remains in the lane.

VI.6 Override Priorities

As with any automated vehicle system, a number of fail-safe options may be programmed into the FTL software to prevent the following vehicle from violating laws. For example, the following vehicle may have a database of (or detect) local speed limits, and be programmed to never exceed the speed limit, even if it causes the distance to the lead vehicle to increase. The following vehicle may also have sensors to monitor when it is swerving in high winds or has poor traction in snow, initiating a fail-safe halt until conditions improve.

The following vehicle may also be equipped with adaptive cruise control (ACC) equipment, which may have one or more front-mounted distance sensors, such as a radar or LIDAR system, to detect a distance to objects and other vehicles. When an algorithm in the ACC system predicts that a collision with an object is likely if the vehicle continues at its current speed, the ACC system can actuate braking to avoid a collision.

In one or more embodiments, the ACC system may allow the following vehicle to operate more safely by slowing or stopping the following vehicle when unexpected objects are detected as it follows the path transmitted by the lead vehicle. This allows for some traffic variation as, for example, additional cars, bicycles, or pedestrians cut in between the vehicles. The ACC may override the instructions to follow, so the following vehicle will not blindly continue to follow the lead vehicle's path if it entails crashing into another vehicle or person. Once the danger has passed, the following vehicle may then pass control again to the FTL system, and resume automatic navigation along the path previously transmitted by the lead vehicle.

The ACC system may be separate from the FTL software, or be integrated as part of the FTL software itself. Likewise, the radar and/or LIDAR sensors used for ACC decisions may be shared with the FTL equipment, or be distinct sensors.

In some embodiments, actions may be taken by the lead vehicle to facilitate automated following. For example it may be useful to slow the lead vehicle in some cases, either automatically or by instructing a driver of the lead vehicle to slow. A lane change to avoid cut-in vehicles may also be done either automatically or by instructing the lead driver to do so. In general these commands and actions may be initiated by the lead vehicle, the following vehicle, or both In some embodiments, a following vehicle may also take other actions based on communicated information from the lead vehicle. These may include braking, acceleration, steering, change of system mode, or others that affect the operation of the following vehicle. These may be based on transmitted information from various types of sensors on the lead vehicle. For example, when a radar on a lead vehicle detects an obstacle in the path of the lead vehicle, the following vehicle may decide to slow or increase gap or take other actions.

In some embodiments, it is contemplated that an automated vehicle without a driver may be controlled remotely. In some embodiments, a vehicle and/or FTL system may determine that a vehicle should be controlled remotely based on an ODD (e.g., if a vehicle unexpectedly enters an ODD it is not able and/or configured to operate in).

VII. System Variations.

As discussed throughout, various embodiments of the systems described herein are contemplated. System variations are described below which may, or may not, be incorporated in any and/or all of the embodiments described in the instant application. As discussed above, the headings included in this application are for the ease of reading, and are not meant to limit the inventions described herein in any way.

VII.1 Larger Convoys

So far, embodiments with a lead vehicle and a following vehicle have been described. However, the same approach to automated following described throughout the instant application can be used for convoys of three or more vehicles.

In response to a link between a lead vehicle and a following vehicle being established, a third vehicle also having FTL equipment may be positioned in coordinated formation with the first and second vehicles (e.g. behind the second vehicle, or between the first and second vehicles, or ahead of the lead vehicle), and a link established using V2V communication between the vehicles (either by having two two-vehicle links, a single three-vehicle link, or combinations thereof) in the same way as the previously-described link had been previously established between the first and second vehicles. Then, once the lead vehicle moves, the second following vehicle executes automated following similarly as to how the first following vehicle executes automated following of the lead vehicle.

In such a scenario, the first or second vehicle would typically also transmit a set of coordinates and environmental information so that the third vehicle could safely and effectively follow in the platoon.

In another embodiment, the second vehicle could simply relay the coordinates and any associated environmental information from the first vehicle on to the third vehicle. Both the second vehicle and the third vehicle would then be following in the path defined by the first vehicle, but at different, subsequent points in time.

In another embodiment, the third vehicle could also establish a V2V communication link directly to the first vehicle, receiving the coordinate information and any transmitted environmental information from the first vehicle at the same time that the second vehicle receives it. The FTL system on the third vehicle would need to manage the third vehicle's speed and position with awareness of the position of the second vehicle, and follow at an appropriate distance, to maintain an effective convoy. As such, in some embodiments a third vehicle may communicate with both a second and first vehicle. In other embodiments, any one of the vehicles may communicate with a NOC to receive information indicative of what the vehicles in its platoon are doing (or vehicles in another platoon, which the vehicle may wish to join).

Any one of these approaches may be used to arrange even more vehicles in a convoy. As long as each vehicle knows the path to follow, and has sensors and software that allow suitable gaps to be maintained between the vehicles in the convoy, several vehicles may be guided to their destination with only a single driver for the lead (or another) vehicle, or, in some cases, a remote teleoperations system.

VII.2 Communication Between Lead and Following Vehicles

For establishing communication between the vehicles, a vehicle-to-vehicle (V2V) wireless communication protocol, such as dedicated short range communication (DSRC), implementing the IEEE 802.11p standard for wireless access in vehicle environments (WAVE) may be used. In the United States, 75 MHz of spectrum in the 5.9 GHz band (5.850-5.925 GHz) has been allocated for use in intelligent transportation systems in the DSRC band. The advantage to using this band is that it is allocated solely for V2V communication, but the disadvantage is that it generally has a limited range (e.g. about 0.5 miles) and often requires line-of-sight between the vehicle antennas, making communication around sharp corners or over hills difficult.

Alternative V2V communications channels, such as those provided by RF cellular networks, may also be used or used alternatively, but in some cases they may have problems with latency when relaying off a remote antenna tower. Direct optical communication links, using lasers and photodetectors, may also be used to establish one or more line-of-sight V2V communication connection between vehicles.

In some embodiments, the communication link between lead and following vehicles will be encrypted. In some embodiments, the encryption will enable the lead and a number of following vehicles to communicate. In some embodiments, that encryption will only enable the lead and a single individual following vehicle to communicate, with communication between the leader and multiple following vehicles carried out using multiple V2V communication channels. In some embodiments, the communication will be one-way communications from the lead vehicle to the following vehicle(s). In some embodiments, the V2V communication will be two-way communication between the lead vehicle and the following vehicle(s).

In some embodiments, the information transmitted from the lead to the following vehicle may bear some similarity to that used in vehicle platooning, in that the lead vehicle may transmit its navigation coordinates, its interpretation of its speed and its position, its engine and braking commands, camera views generated by the lead vehicle, and other information needed to help the following vehicle maintain a safe gap while platooning. More on communication between vehicles while platooning may be found in the previously cited patent applications, which have been incorporated by reference in their entirety for all purposes in this application.

VII.3 Communication with a NOC

For some embodiments, additional communication links between the vehicles in a convoy engaged in automated following and a remote network operations center (NOC) may be desired. The NOC may exist in a multi-tenant environment (e.g., the cloud, a distributed computing system. In some embodiments, a NOC may transmit to one of both of the vehicles the identification information for the vehicle with which it should link, and may also monitor the progress as the vehicles navigate through the landscape. In some embodiments, authorization to link may be provided by a NOC, and only vehicles so authorized may form a convoy for automated following. In some embodiments, a NOC may provide authorization for FTL only when vehicles are within a particular area, such as traveling on a particular highway.

The communication link between the vehicles and the NOC may be through any wireless means, such as a cellular LTE, 5G, 6G, etc. network or satellite telephony. In some embodiments, only one of the vehicles may be linked directly to the NOC, with the other vehicle(s) communicating to the NOC by relay through the vehicle with the direct connection. In other embodiments, each vehicle in the convoy may have a direct communication link to the NOC.

VII.4 Speed, Engine and Braking Control

Controls of the vehicle speed, engine torque, braking, etc. in an FTL system may be managed by the systems and algorithms similar to those as used in implementing driver-assistive platooning systems. Examples of such platooning systems are described in the platooning-related US patent applications mentioned above, as well as in U.S. provisional patent applications 61/505,076, filed Jul. 6, 2011, and 61/792,304, filed Mar. 15, 2013, as well as U.S. patent application Ser. No. 13/542,622, filed Jul. 5, 2012 (now issued as U.S. Pat. No. 8,744,666), Ser. No. 14/855,044, filed Sep. 15, 2015 (now issued as U.S. Pat. No. 9,645,579), and Ser. No. 16/010,368, filed Jun. 15, 2018. These applications are hereby incorporated by reference in their entirety for all purposes.

In one or more embodiments, the vehicle may be accelerated to maintain a predetermined gap between itself and the vehicle it identifies as the lead vehicle in the convoy, and control engine torque, engine speed, vehicle cruise control, braking, and other command systems to manage the vehicle acceleration and deceleration to maintain that monitored gap.

In one or more embodiments, in addition to control systems and algorithms to control to a gap, additional control algorithms may be needed in some embodiments to compare the current following vehicle position and the corresponding sensors information with information from the lead vehicle. Comparisons between what the lead vehicle experienced at certain coordinates may be made with what the following vehicle experiences at the same coordinates, and if there are too many discrepancies (e.g. bumps in the road present for one are not present for the other, roadside objects detected for one are not present for the other, etc.) the algorithms may be given the authority to flag the discrepancy and dissolve the convoy, following predetermined fail-safe safety protocols that will be in place for any automated vehicle shutdown.

In the automated following application, the speed and gap control can follow different objectives than that in driver-assistive platooning, or it may follow closely the same objectives. For example it may be desired to follow at a gap that allows the full stopping distance of the vehicle to be less than the length of the stored path, to make sure the vehicle can stop safely if needed.

VII.5 Steering Control

If the following vehicle(s) in a convoy using automated following are driverless, the FTL system(s) in the following vehicle(s) must also manage steering of the following vehicle(s). In some embodiments, the steering control may mimic functions found in other self-driving vehicles, in that a following vehicle for example has a suite of environmental sensors (e.g. radar, lidar, etc.) and will control itself to stay in its own lane, follow traffic rules, stop at stop lights or signs, not hit detected pedestrians, and otherwise obey traffic rules as programmed in any autonomous, self-driving vehicle.

Steering control for an automated vehicle typically comprises actuators to turn left and right, and to provide those instructions at a varying rates. Sensors are typically provided to detect the edges of the lane in which the vehicle is traveling, and to detect and keep track of other traffic in neighboring lanes to anticipate possible hazards, such as a cut-in. In some embodiments, steering controls direct the rotation of the steering column, as a "virtual driver". In some embodiments, the steering controls address actuators that direct the wheels to turn in the same manner as the steering column does, without using the steering column. The steering systems may be electric or hydraulic, so the actuation itself can then be electric (either pure electric, or electric on top of hydraulic), or in some embodiments directing the hydraulics system directly.

Commonly the steering systems can be commanded by a torque input or a position input. If torque, the command is to apply torque to the steering, and the steering torque can be monitored for control. If position, the commands set a target for a control loop around position, which then can apply a torque for steering to achieve the desired position. In some embodiments they could also have different inputs, for example desired curvature or desired lateral acceleration.

In some embodiments an amount of, or a rate of, steering may be determined on one vehicle, and abstracted based on attributes of that vehicle. That abstraction can then, in some embodiments, be applied to another vehicle, and, based on attributes of that other vehicle, be translated into an equivalent amount of steering/rate of steering such that the vehicle moves in the same, or substantially the same direction/rate of change in direction. For example, two vehicles of different makes and models may move differently even though a steering wheel is turned at the same velocity. To correct such a problem, an amount of actual movement/change in direction may be equalized by abstracting an amount/rate of steering from a first vehicle and applying it to a second vehicle, which may be a different make and/or model from the first.

In some embodiments, steering control loops described herein can use various algorithms common in the industry. These typically contain a feedforward component, which is a computed amount of steering torque, motor current, or other signal, based on a predicted amount needed to reach the objective angle/speed/acceleration. They also contain a feedback component, which is computed based on error from the target angle, torque, current, or other signal. These may be considered over different time horizons during computation.

VII.6 UI/UX

Figure 11A:
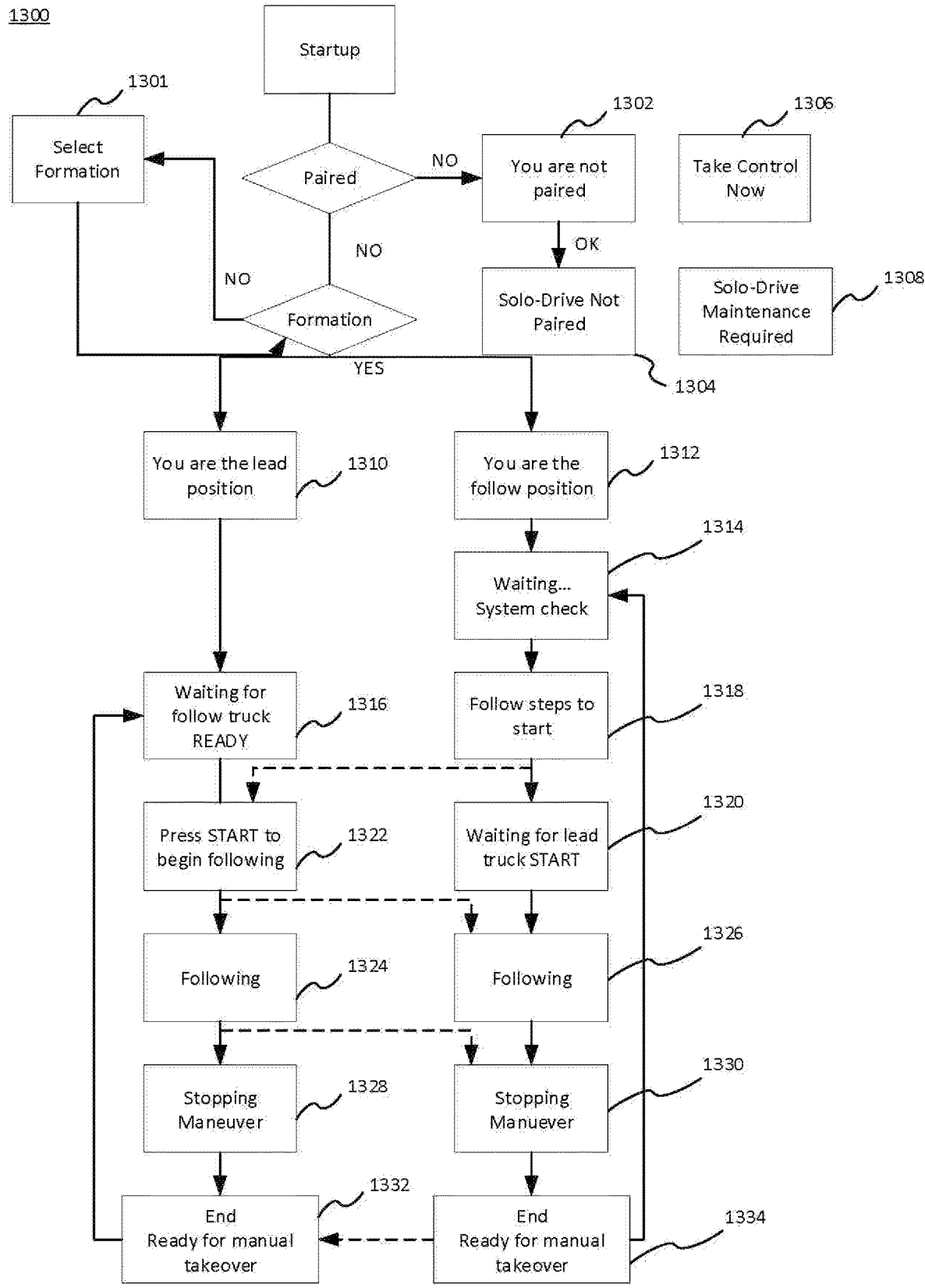
FIG. 11A illustrates an example flowchart of displays shown by a user interface system, in accordance with some embodiments.

FIG. 11A illustrates a flowchart of an example process, in accordance with some embodiments. Example process 600 includes a method for providing information to a user via a display, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 11A should not be construed as limiting the scope of the invention. In one or more embodiments, the steps of FIG. 11A can be performed by example systems included herein.

In some embodiments, a system may start, and determine if a first vehicle is paired with a second vehicle. If not, a display may show that the vehicles are not paired 1302, and that a vehicle is in a particular mode corresponding with solo-drive 1304. Also, user interfaces may show when a driver should take control of a vehicle 1306 or when maintenance is required (and that a vehicle may need to drive in solo-drive mode) 1308.

In some embodiments, a formation must be selected and a display may convey that to a driver at element 1301. After a formation is selected, a display may show a driver that they are in the lead position 1310, or that they are in the follow position 1312. A system may display that it is waiting for a system check 1314, or that its waiting for a follow vehicle to be ready to participate in an FTL-type platoon 1316. A screen may show what steps to take to start 1318 which may include: (1) pressing a brake pedal; (2) releasing a parking break; (3) placing the vehicle in gear; and (4) pressing a start button. A screen may appear in a vehicle In various embodiments, various displays appearing in one or more vehicles, and selections made by a driver, may cause displays in one or more other vehicles to change (e.g., move through the steps shown in FIG. 11).

A system may display that the driver should press a start button to begin following 1322, while a screen in a paired vehicle may show that it is waiting for the lead truck to start 1320. In response to the FTL system operating displays may show that a vehicle is following another 1324 and 1326. A system may display that a stopping maneuver is occurring 1328 and 1330. Also, a system may display that a following truck in an FTL system is ready for manual control/takeover 1332 and 1334 (which may be caused by applying a parking brake, pressing a stop button, placing a vehicle in neutral, etc.).

Figure 11B:
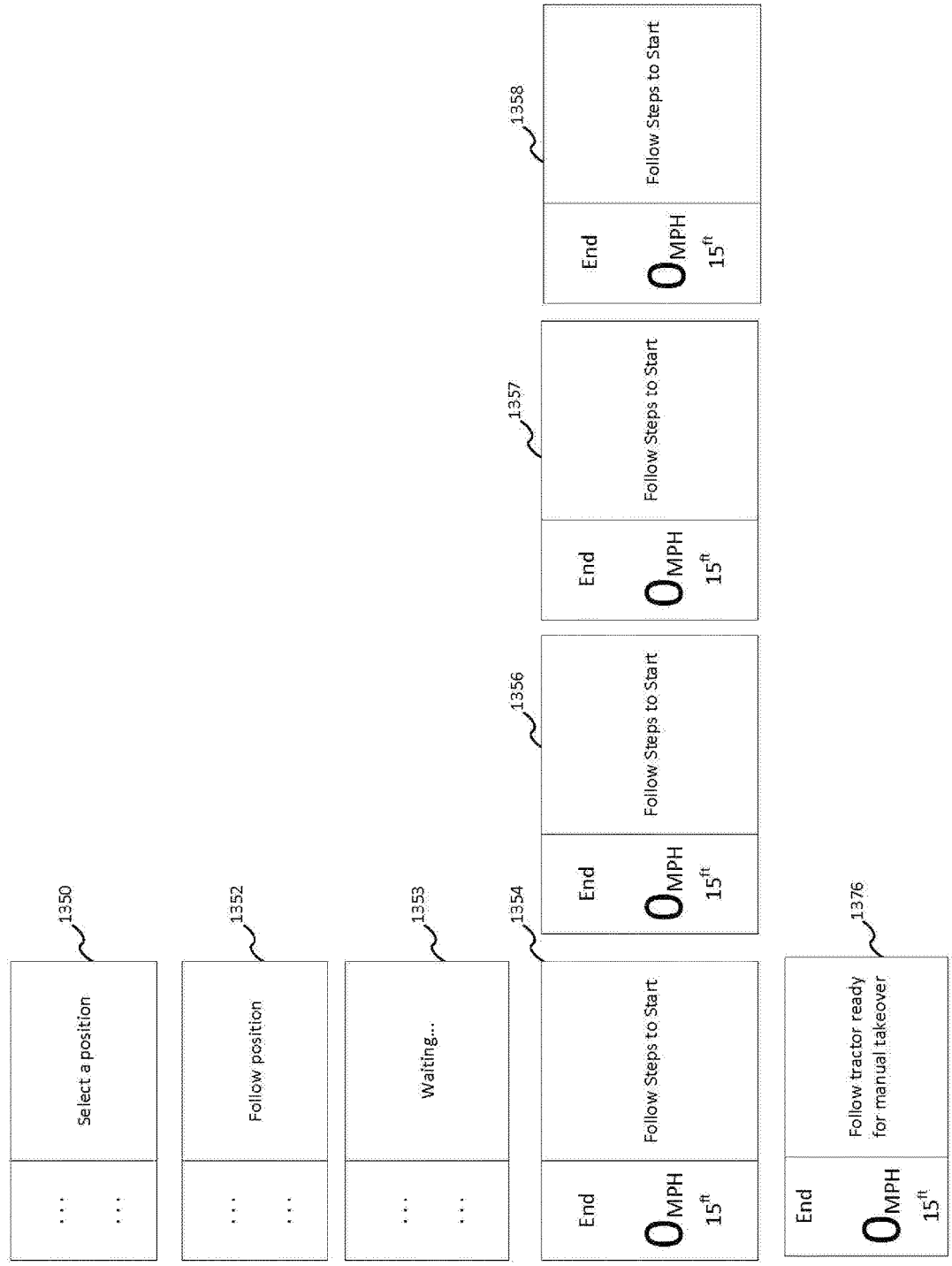
FIGS. 11B-11D illustrate example user interface systems, in accordance with some embodiments.
Figure 11C:
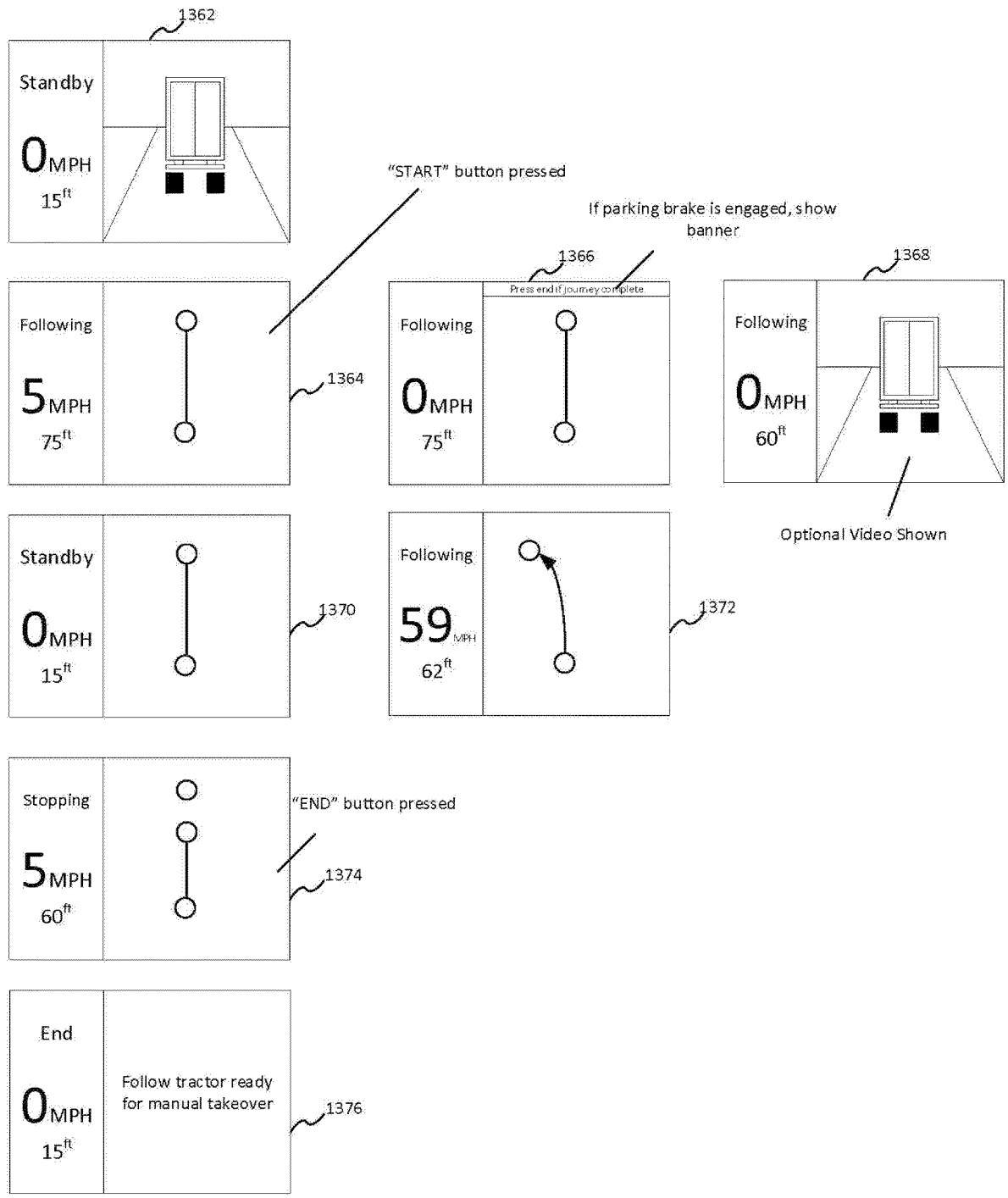
Figure 11D:
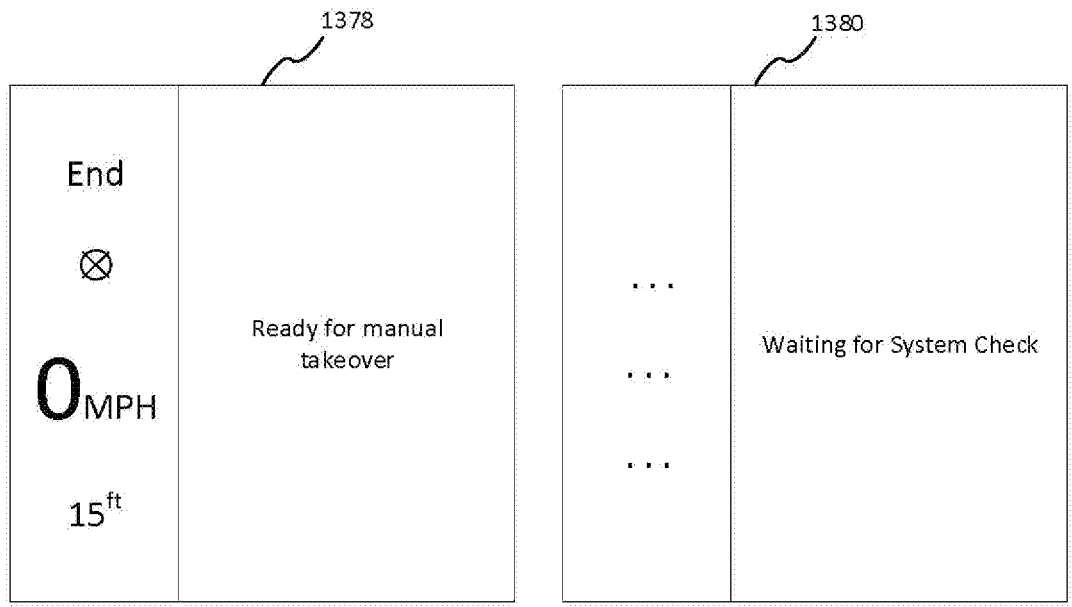

FIGS. 11B-11D illustrate example user interface systems, in accordance with some embodiments. Example user interface system 1300 shows a flow that a display may show a driver while engaging in an FTL configuration.

Display 1350 shows that no formation has been selected. Display 1352 shows that a vehicle has been assigned a follow position. Display 1353 shows that a system check is occurring. Display 1354 shows steps that need to be completed for an FTL system to start. Displays 1356, 1357, 1358, show steps that must be completed for an FTL system to start. Display 1360 also shows steps that must be completed for an FTL system to start.

Display 1362 shows images captured by a camera on a rear vehicle. Displays 1364, 1366, and 1368 show the views on a user interface when vehicles are stopped, and may include a distance between vehicles and a speed of vehicles.

Displays 1370 and 1372 illustrate example images when vehicles are in an FTL system and traveling, and display 1374 illustrates and example user interface when an end button is pressed. Display 1376 illustrates what a user interface may show in response to the FTL session being in the process of ending. Displays 1378 shows a screen indicating that a vehicle is ready for manual takeover, and display 1380 shows a screen indicating that systems are being checked (e.g., safety mechanisms are activated).

VII.7 Selective Focus Lidar Systems

In some embodiments, lidar systems (or camera, or other sensor systems) may be optimized for systems described within the present application. To save resources, systems herein may selectively deactivate regions of imaging systems (e.g., lidar and/or camera), or enhance the resolution of particular regions. In some systems described herein (e.g., FTL systems or otherwise), various sections of a scene may be of greater interest to a perception system. For example, a front truck may be a scene of greater interest, or the side of a road may be a scene of greater interest. In some embodiments, scenes to a side and/or rear of a vehicle may be of lesser interest.

In one or more embodiments, a lidar is mounted on the rear of a tractor for self-driving. It would be useful to see behind the truck when there is no trailer and it would also be useful to see the adjacent lanes. However, if the truck has a trailer, a large region of the lidar field of view would be wasted. Instead of sending lots of data about the trailer, you could disable that region of FoV. The resolution of frame rate could then be increased on the adjacent lanes that are still a region of interest. In some embodiments, to accomplish this solid state lidar may be used as opposed to mechanical systems.

In one or more embodiments, a system could request increased resolution on objects that have been detected by lidar or other systems (radar). This would allow for increased frame rate or resolution on objects as opposed to blank stretches of road. Boosting resolution and frame rate globally runs into limits on total bandwidth and processing power.

This may be similar to how fighter jets have both scanning and tracking modes in the radar systems. Once an object is detected they can focus additional radar energy on the object for more precision.

VII.8 Dual Vector Offset Determination

In one or more embodiments, two radio transmitters located on the cab of the lead vehicle can provide both navigational points of reference and information regarding the orientation of the lead vehicle cab relative to its line of travel. For example, one or more directional antenna located on the vehicle trailer and/or tractor along may produce an omni-directional pulse from which the direction/bearing of the lead vehicle's cabin may be determined relative to its line of travel by the trailing, platooning vehicles (which may be in an FTL mode). In some embodiments, phased antenna arrays can be used instead of directional antennas.

In various embodiments, a system can also have one system on the tractor and one on the trailer. Such an embodiment may allow for the following truck to sense the movement of the tractor and trailer separately and could allow for better coordination of turns in an FTL configuration.

Such a systems may be similar to a tactical navigation system (TACAN) or a VOR (VHF Omni-range Receiver) system, but systems contemplated herein provide for greater being precision and distance-measuring.

In some embodiments, in response to a tolerance for error being less than a threshold level, a system may determine the location of the lead vehicle's cab instead of its trailer. Knowing the location of the lead vehicle's cab (as opposed to the rear of its trailer) along with the time, degree, and duration of course deviation of the lead vehicle's cab may provide information necessary to calculate and execute a coordinated turn.

As some background, U.S. Military TACAN (Tactical Air Navigation) was developed in the 1950's (itself derived from the British OBOE system used in World-War II.)

In some embodiments, TACAN is a UHF signal providing distance and bearing/direction (azimuth) to aircraft in flight. Its design goals in the military were for portability, ease of deployment and reliability in static and dynamic environments such as fixed ground, moving vehicles or pitching Aircraft Carrier decks. It is a mature and vetted system that remains in active use.

In some embodiments, a constant signal is transmitted with a parasitic element reflector to one side that rotates at 900 RPM creating a cardioid shaped 15 Hz amplitude modulated signal. Modern technology allows for an electronic rotation of the parasitic element (Phased Array and others.) When this rotating wave's amplitude peak is directed due East there is a signal burst on a separate frequency that serves as a reference burst. Systems described seeks to utilize this technology in a novel way.

In some embodiments, placing two vector (azimuth and distance) transmission units on the lead vehicle mounted perpendicular to the line of travel on opposite sides of the lead cab provides two points of reference and five means of calculation (three triangulation and two trilateration) by which to determine the lead vehicle's cab position.

In some embodiments, two TACAN like transmitters can disambiguates the scenario where it cannot be determined from one TACAN element as to which of these two scenarios are occurring. A single vector (azimuth and distance) may allow the following vehicle to determine it's lateral and proximal position relative to the lead vehicle, but may not be able to differentiate as to whether the lead vehicle is turning or if the following vehicle is off course/laterally mis-aligned.

In embodiments described herein, augmenting a single transmission unit with a secondary positional fix such as lidar or a camera improves accuracy, but presents challenges when correlating data from disparate systems. In some cases, the lidar and/or camera references the back of the lead vehicle's trailer and not the cab. Further, the lidar and/or camera systems may be part of platooning and may be best utilized for its intended use and not oversubscribed.

As such, transmitters may be used, and in some embodiments variations between these transmitters resulting from a variety of factors such installation anomalies, impact events, vibration, wind deflection or hardware variances may be factored out through various means to cause a system to cause a vehicle to assume a particular position such as: proportional-integral-derivative (PID), simple statistical averaging or whatever practical means is determined to be most effective and appropriate.

VII.9 Compensation For Crosswind And Other Perturbations

In some embodiments, systems described herein may adjust a vehicle location (e.g., relative to another vehicle) to improve fuel efficiency and/or reduce drag. For example, a system may determine an optimal distance between two vehicles. In some embodiments, a system may determine one or more perturbations and compensate for them by adjusting one or more vehicles' positions. For example, a rear and/or front vehicle may determine that crosswinds are reducing a vehicles' fuel efficiency. In such an embodiment, a rear vehicle and/or front vehicle may change its position relative to the rear and/or front vehicle. Such maneuvering (e.g., a rear vehicle moving slightly to the left while platooning and/or in FTL mode) may increase a rear vehicle's ability to draft off a front vehicle and/or reduce drag on a front vehicle created by the perturbation (e.g., crosswind).

In one or more embodiments, a vehicle's desired location (e.g., the location where it should be to conserve more fuel in response to perturbations) may be determined based on input received from machine learning and/or artificial intelligence software and/or hardware.

VII.10 Controlling Trailer Wheels

In some embodiments, controlling the path followed by the trailer wheels of a tractor/trailer when negotiating a turn or road curve may be performed, such that the trailer wheels follow the path of the tractor wheels, or other more favorable path, rather than passively cutting the corner.

Today, fixed trailer wheels cut corners through turns and road curves, leading to potential collision of the trailer(s) with obstacles that are not in the path of the tractor, and thereby also place fixed limits on the geometry of a turn or curve that may be successfully negotiated by a given tractor/trailer(s) combination. Current behavior may also make it more difficult to implement automated following of one truck by a second truck, because the second truck must follow through a turn or curve the path of the lead tractor, rather than the path of the rear of the trailer.

In various embodiments described herein, trailer wheels may actively control their path when maneuvering, such that the wheels follow a more favorable path through the maneuver, for instance following the path of the rear tractor wheels through a turn.

A control system may consist of (1) a control processing unit, (2) a set of sensors or signals used to select a path to be followed and/or obstacles to avoid, (3) a method of steering the trailer wheels, including one or more of (a) controlling the steering angle of the trailer wheels, (b) differential braking of the trailer wheels, (c) trailer axle offset, (d) active control of the rear tractor wheels and/or king-pin geometry. In some embodiments, trailer wheels of a rear vehicle may cause a trailer to move into the same position as a front vehicle was in when it passed through that position (or envelope). In some embodiments, the trailer wheels may be controlled at least in part by a front vehicle, whether in a platoon mode and/or an FTL mode. In some embodiments, in response to a front vehicle colliding with an object such as a curb, a rear vehicle may use its steerable trailer and/or rear wheels to avoid the object (in some cases, even if it means the rear vehicle strays outside of an envelope created by the front vehicle).

In some embodiments, rear wheels can be steered, and not be static, such that a trailer can make more precise turns, and potentially create and/or follow in a smaller envelope, which may help decrease obstacle collisions.

VII.11 Non-Driver Truck Operators

In some embodiments, vehicles may include more operators than required. For example, it is envisioned that two drivers may meet at a location, and be able to engage in an FTL type system. In such an embodiment, one of the two drivers may not be needed to control either vehicle. As such, that driver is able to perform other tasks. Other tasks may include performing system safety checks, determining routes, directing fleet traffic, etc. Such tasks may reduce the need for full-time external system administrators. As such, in some embodiments, in response to one or more vehicles entering FTL mode, a driver of one of the vehicles may be provided with tasks (e.g., a queue of tasks, which may be allocated via a task allocation system such as JIRA), and/or receive permission to perform tasks.

For example, in some embodiments 2 operators could control 3 vehicles. In such an example, vehicles may platoon in an FTL fashion with only 2 operators. The operator in the lead truck would be responsible for driving and the other operator could be responsible for monitoring the platooning system. Like a pilot/co-pilot or pilot/flight engineer system. In order to deal with fatigue, operators could change roles by rotating the order of the trucks in the platoon (assuming weight is safe). Also, this system allows for a pair of operators to be responsible for a platoon of trucks $N>=2$ and both ride in the same cab. Again in a pilot/co-pilot or pilot/flight engineer type role. While one drives the other can be responsible for monitoring the state of the platoon, communicating with NOC/dispatch/HQ, checking road/weather conditions. Potentially, cabs could be configured with a second set of controls. These controls could be used to switch driving roles or they could be used to remotely operate a follow truck in the event of a system failure.

Also, in a system with m operators and n trucks ($m<=n$), the operators could be able to work together in loading/unloading operations and assist in any maintenance that is typically required of drivers.

This system could improve safety for all platooning configurations $m<=n$ and save costs in all systems $m<n$. $m=n$ systems would be roughly the same costs.

VII.12 Guided Automation

In some embodiments, a fully automated vehicle may be utilized. In other words, in some embodiments, a rear vehicle in an FTL system may be able to operate autonomously (e.g., without the need for a front vehicle).

In one or more embodiments, a fully automated system in a rear (and/or front vehicle) may be activated in response to a cut-in. For example, in response to one or more vehicles entering a gap between two platooning vehicles/vehicles operating in FTL mode, a rear and/or front vehicle may enter a fully autonomous mode of driving, such that it is not being controlled by systems included in another vehicle.

In one or more embodiments, platooning and/or FTL modes may be activated/operational when the right conditions exist (e.g., traffic permits, vehicles are not in a geofenced zone that prohibits platooning, etc.). Vehicles, in some embodiments, may be aware of the traffic around them (e.g., determine vehicles around them, those vehicles' speed, size, and other characteristics, static objects, weather conditions, whether one or more vehicles they may platoon with are properly connected to a system (e.g., a satellite system, a network operations system, etc.). In some embodiments, one or more vehicles may broadcast such information to other vehicles, and/or back to a system administrator. In response to system/situational characteristics being less than optimal (e.g., a cut-in, vehicles traveling too slow (e.g., less than 40 mph), an absence of reliable communication (e.g., between ABS braking units and an ECU, between one or more vehicles and a NOC, etc.)), a system may cause one or more vehicles to change from a first mode (e.g., FTL) to a fully automated mode. In one or more embodiments, the vehicles will nevertheless attempt to draft off one another (e.g., travel in an optimal formation including gap, offset, etc.), even while at least one vehicle is traveling in a fully automated mode.

In one or more embodiments, a driver may be in a front vehicle and a rear vehicle. For example, that driver may be controlling one or more aspects of one or more vehicles, including its lateral and longitudinal speeds (e.g., its acceleration, its braking, and/or its steering). Vehicles other than the front or back vehicles may be controlled by the front and/or back vehicles, or be autonomous such that they do not require controls from the front and/or back vehicles. In some embodiments, a driver may input information (e.g., via a switch, pedal, steering wheel) which may cause the vehicles that are not in the front or rear of the platoon to stop operating in a fully autonomous mode and operate in a partially automated mode (e.g., in an FTL mode).

VII.13 Slam

In various embodiments, vehicles may use sensors and HAD maps to determine where they are located. A vehicle's sensors may also be used to generate a map. In various embodiments, a front vehicle, or a vehicle that has traveled in a certain location earlier, may transmit information to a rear vehicle. This may occur during FTL operation to assist a rear vehicle. For example, a front vehicle and a rear vehicle may be operating in FTL mode, and determine—based on an HAD map—that an object should be sensed. In various embodiments, sensors on a front vehicle may determine that the expected object is not there, and create a new map (or modify an existing map), and/or send that information (e.g., the object is not there, or a new/modified map) to the rear vehicle.

In some embodiments, such information may be useful to a rear vehicle in FTL mode. For example, if a dissolve occurs, a rear vehicle may know whether it may pull over to the side of the road because an object expected to be there (based on an original HAD map) is not there (based on information provided by the front vehicle, which may be in the form of a new/modified map).

In some embodiments, it is contemplated that a rear vehicle may provide information it senses to a front vehicle, and that information may be used to modify an HAD map and/or create a new HAD map. Regardless of where the information is sensed and/or where an HAD map is created or modified, the information and/or created/modified HAD map may be transmitted to any vehicle platooning and/or operating in FTL mode.

VII.14 Remote Braking And Steering Verification

In some embodiments, steering verification may be performed by one or more of the vehicles. For example, two vehicles may be capable of traveling in FTL mode. In some embodiments, a first vehicle (e.g., a front vehicle) may command speed, braking, steering, torque, gear selection, and or other actions in a second vehicle (e.g., a rear vehicle). In order to operate in platooning mode and/or FTL mode, in some embodiments, the first vehicle must receive information obtained by sensors on the rear vehicle indicating the commands are correctly being implemented on the rear vehicle. In some embodiments, such verification may be sent to the first vehicle from the rear vehicle, which may perform verifications of data in the form of: data gathered from a sensor remote from the controlled part of the rear vehicle (e.g., a wheel speed sensor on the rear vehicle to determine whether speed commands transmitted from the front vehicle are causing the wheels on a rear vehicle to travel at the speed commanded by the front vehicle), data gathered from a signal sent from an ECU on a rear vehicle to a controlled part of the rear vehicle (e.g., data traveling from a VECU to an engine or other part, data from a BECU to a brake, data from a TECU to a transmission, etc.), and/or data received at the rear vehicle from the front vehicle (e.g., before it is distributed to one or more ECUs). In one or more embodiments, in response to the steering and braking (or other commands) not passing verification (not operating correctly), two vehicles may not platoon and/or travel in FTL mode.

In some embodiments, a front vehicle may determine whether a rear vehicle is operating correctly based on sensors located on the front vehicle. For example, a front vehicle may use a camera, lidar, or other sensor to determine whether a rear vehicle is traveling at a correct speed, has a correct steering angle/wheels turned to the correct position, is staying within an envelope, etc. If one or more sensed operations of the rear vehicle are not appropriate, the vehicles may not platoon and/or travel in FTL mode.

In some embodiments, errors on either vehicle may be determined by a system wherein incorrect steering, torque, transmission commands, brake commands, are determined based on data received from and/or generated by a machine learning algorithm and/or artificial intelligence.

VII.15 Traffic Map/Density Generation

In one or more embodiments, a platooning and/or FTL system may determine information associated with traffic. For example, vehicles platooning and/or operating in FTL mode may use sensors to determine an amount of traffic on a particular road. Such information may be shared with a NOC or other distributed computing system. A system may create a map and/or information associated with traffic (e.g., speed, density, amount of tractor-trailers, amount of vehicles platooning and/or traveling in FTL mode, etc.). In some embodiments, vehicles configured and/or designated to travel in FTL mode may be routed based on traffic information. In some embodiments, the route(s) chosen may be based on an amount of fuel that may be saved or an amount of time for one or more vehicles to reach a destination.

VII.16 Lane Changing And Speed Adjustment Strategies

In various embodiments, an FTL system may cause one or more vehicles to change lanes or perform other maneuvers, which may be different from maneuvers a vehicle being driven by a human driver or operating in a fully autonomous mode (e.g., not receiving commands from another vehicle). For example, in some embodiments, a vehicle traveling as a front vehicle or a rear vehicle in an FTL configuration may be configured to change lanes in a manner that is less likely to cause a cut-in as opposed to a vehicle traveling autonomously without being a front vehicle or a rear vehicle.

In various embodiments, calculations may be performed by a system and/or generated by a machine learning and/or artificial intelligence system that at least in part cause a particular maneuver to occur in a particular way be one or more vehicles traveling in FTL mode. Such calculations may be generated to optimize operation of FTLing vehicles (also referred to as vehicles operating in FTL mode). For example, a vehicle that is operating in FTL mode may change lanes when a sensor on one or both of the vehicles senses a vehicle approaching (e.g., via an onramp on a freeway). In response to the approaching vehicle, calculations may be performed such as determining vehicles to the left of a rear and/or front vehicle operating in FTL mode. In one or more embodiments, a rear vehicle may change lanes to its left in response to a vehicle not being located in the lane to its left. Either a front or rear vehicle may determine (e.g., via sensors) whether a maneuver can and will be performed. For example, a system may cause a front vehicle may determine that there is a condition that prevents prevent/causes a rear vehicle operating in FTL mode to perform or not perform a maneuver. For example, a front vehicle may determine there is a vehicle to its left that is reducing its velocity (or otherwise may collide with a rear vehicle if the rear vehicle changed lanes to its left), and cause the rear vehicle to not change lanes or perform another maneuver. In some embodiments, a rear (or front) vehicle may be configured to perform an operation (or not perform an operation), such as changing lanes, unless a signal is received from another vehicle (which may be the corresponding rear or front vehicle). Other maneuvers are contemplated being performed by two or more vehicles traveling in FTL mode (which may not be the preferred/configured way to perform the maneuvers were one or more of the vehicles traveling in a fully automated mode (e.g., not receiving commands from another vehicle)): changing lanes, merging onto a freeway, exiting a freeway, turning, stopping at a light, making a U-Turn, traveling in reverse, docking, parking, determining a route, updating a map, activating particular sensors, providing certain information via audio or a visual display, activating a particular camera, adjusting speed, slowing down, applying a compression brake, increasing an amount of torque, changing gears, activating turn signals, activating signals indicating the vehicles are operating in FTL mode, stopping for passengers to board, opening its doors, determining a parking space to park in, etc.

VII.17 Prioritizing Data Sent Via Antennae

In some embodiments, data sent from a front vehicle to a rear vehicle, or vice-versa, when the vehicles are operating in FTL mode may be treated differently than data received from a different source. For example, a vehicle may receive commands from a self-driving module and an FTL/platooning receiver module (which may be different pieces of hardware). In some examples, the commands received at an FTL/platooning receiver may take precedent over commands issued by a self-driving module.

In some embodiments, a rear or front vehicle may normally determine that it will perform certain procedures based on information collected by its sensors. In some embodiments, information received from another vehicle will take precedent over the information received from the vehicle's sensors.

In some examples, information received at a portion of a vehicle (e.g., a platooning ECU/FTL ECU, a brake ECU, an engine ECU, etc.) may be based on information received from one or more of: a self-driving module, a platooning/FTL receiver, and sensors on a front and/or rear vehicle. Information received from these three sources may have an associated score (or weight). A front or rear vehicle may accordingly perform operations based on those three scores. Of course, more, or fewer inputs (and thus scores) may be used by a vehicle. As an example, a rear vehicle may receive input that causes it to perform actions from a self-driving module, another vehicle, a satellite, NOC, or other distributed computing system, etc. If the score of the input received from a first source (e.g., from the data sent by another vehicle), is above a threshold and/or a certain amount greater than the score of second source (e.g., its sensors or a self-driving module), then the rear vehicle may perform an operation based only on the input of the first source, or based at least partially on the input of the first source. How much emphasis each source has on the operations may vary between systems, and various combinations of information from multiple sources may be used in combination (and they may be used differently/apply different amounts of commands based on their score).

VII.18 Handling Unexpected Terminations

In various embodiments, a rear and/or front vehicle may perform various operations when an FTL system dissolves (e.g., ends). Operations may include, but are not limited to, causing the front and/or rear vehicle to: determine its surroundings using sensors, determine that the side of the road (e.g., a shoulder) is save to pull over onto, pull over to the side of the road, stop without pulling over, enter a fully autonomous mode (e.g., where another vehicle is not controlling it), begin to be controlled remotely (e.g., using teleoperation, not from a paired vehicle, etc.), cause a visible signal to activate, cause a wireless signal indicating the dissolve to vehicles not included in the FTL platoon, provide information to a NOC or other distributed computing system (e.g., it's location, traffic, malfunctions, whether a driver is in the vehicle, etc.), receive information from a NOC or other distributed computing system (e.g., a time when it will be "picked up" (e.g., by another vehicle), what type of vehicle will pick it up (e.g., another FTL vehicle or vehicle that will physically tow it), a location it should move to (e.g., which may be a location designated for a vehicle that ended an FTL session and doesn't have a driver), etc.).

In one or more embodiments, operations may include receiving information from vehicles that were not included in the FTL platoon (e.g., from a vehicle traveling next to the FTL platoon—such information may assist the vehicle travel such that it may rejoin an FTL platoon/draft).

VII.19 Compute Power And Cooling

In various embodiments, aspects of systems FTL systems described herein may be modified to conserve resources. In some embodiments, aspects of an FTL system may be modified to reduce compute power and/or heat emitted by hardware, including processors.

VII.20 Levels And Types Of Redundancy

In various embodiments, FTL systems may have redundant systems. One or more FTL systems may include multiple: receivers, ECUs, and brake systems, engine systems, etc., in order to provide a safe system (e.g., in accordance with a standard such as a particular ASIL level). In one or more embodiments, an FTL system may be connected to multiple satellites, and/or have multiple GNSS receivers.

VII.21 Securing Vehicles

In one or more embodiments, if a vehicle configured for FTL may perform various operations when it stops traveling. For example, after an FTL session a vehicle that was being controlled by another vehicle may: lock or unlock its doors or a trailer gate; send a signal to a weigh station, docking station, store, smart phone, remote terminal, etc.; allow its doors or a gate to be unlocked using a keypad or other instrument that doesn't require a key, etc.

VI.22 Determining Location When On Unexpected Terrain

In one or more embodiments, a vehicle configured to travel in FTL mode may determine that its wheels are traveling at speeds that would not typically correspond with the vehicle's movement. For example, a vehicle may be on a banked turn and travel at a velocity (e.g., a lateral and/or longitudinal velocity) that is different than the velocity the vehicle would travel if its wheels were turning at the same speed but the vehicle were not on a banked turn. In such an embodiment, one or more vehicles platooning and/or traveling in an FTL platoon may provide this information to another vehicle in the platoon/FTL platoon. It is contemplated that other situations exist in addition to banked turns where a wheel speed may differ from what is expected, such as if the wheels on one side of a vehicle are traveling on a terrain that is different from the terrain the wheels on the other side of the vehicle are traveling on.

VI.23 Different Modes

In various embodiments, one or more of the modes of operation may be activated based on a number of inputs, and some may be activated in tandem. For example, in some embodiments a type of FTL may be in operation in response to one or more vehicles operating on a private roadway, unless the vehicles are instructed to operate as they would on a public roadway in response to an input received from a remote location (e.g., a system administrator).

VI.24 Synchronizing Indicators

In various embodiments, indicators are included on the vehicles described herein. In some embodiments, indicators may indicate a vehicle is going to turn, change velocity, or perform another action. These indicators may be commonly referred to as turn signals or brake lights. In one or more embodiments, the lights may be activated within a vehicle or remote from a vehicle. For example, a rear vehicle's brake lights may be activated in response to a signal from (1) a front vehicle, (2) a remote base station (which may be static such as a cellular tower), (3) a satellite, etc. In some embodiments, vehicles in various FTL modes may have lights that are activated in a different manner than if that vehicle were platooning with other vehicles.

In some embodiments, a signal indicating two vehicles are traveling in an FTL platoon are contemplated. For example, a signal may be one or more visible lights. In some embodiments, a signal may be smoke or another substance emitted by a vehicle (e.g., the front vehicle). In some embodiments, more than one stream of smoke may be emitted by a front vehicle.

VI.25 Safety In Dangerous Locations

In some embodiments, an FTL system may be deployed in a dangerous location. For example, one or more tanks or armored people movers may be controlled by one or more other vehicles. In some embodiments, it is contemplated that a vehicle in an FTL platoon (such as a front vehicle), may be teleoperated, and it may send information to rear vehicles that is used to assist them with traveling. So, for example, a front vehicle may not have a driver and be teleoperated, and one or more rear vehicles may be controlled via an FTL system. This may eliminate a need for drivers in the entire platoon.

In one or more embodiments, a vehicle that is controlling other vehicles in while FTLing may be damaged. In such an embodiment, another vehicle may automatically begin transmitting information that can control other vehicles. In some embodiments, if a vehicle that is being teleoperated is damaged, another vehicle may switch to a teleoperations mode, and it may then control other vehicles in an FTL platoon. In one embodiment, in response to a vehicle that is controlling other vehicles being damaged, a display or notification may be provided in another vehicle, and may indicate that a driver must take control of the vehicle. In one embodiment, in response to a vehicle that is controlling other vehicles being damaged, another vehicle may need to receive input (e.g., a button pushed by a passenger) such that it may be teleoperated, be controlled by a different vehicle, and/or control other vehicles.

VIII. Example Method

Figure 12:
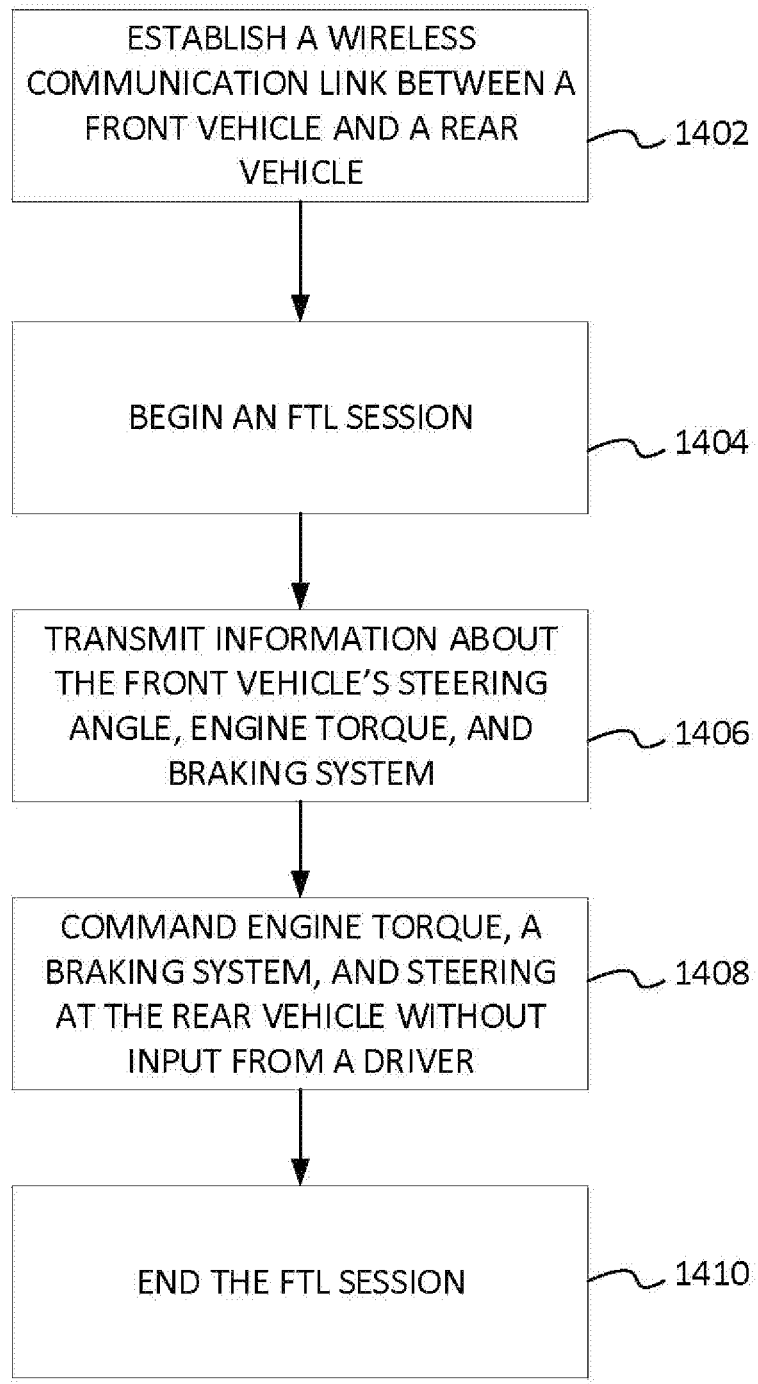
FIG. 12 illustrates an example flowchart, in accordance with some embodiments.

FIG. 12 illustrates a flowchart of an example process, in accordance with some embodiments. Example process 1400 includes a method for determining a time for a platoonable vehicle to travel on one or more roads, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 12 should not be construed as limiting the scope of the invention. In one or more embodiments, the steps of FIG. 12 can be performed by example systems described herein.

In step 1402, a wireless communication link is established between a first vehicle and a second vehicle. For example, two vehicles may begin communicating with each other over a DSRC link. In some embodiments, the vehicles may communicate information to each other indicating they are capable of operating in a follow-the-leader (FTL) mode (e.g., where a front vehicle issues controls a rear vehicle (e.g., its latitudinal and longitudinal velocities)). (Note that controlling a vehicle may include commanding an amount of torque).

In step 1404, an FTL session begins. An FTL session begins when a rear vehicle moves into place to operate in an FTL mode and/or begins being controlled by a front vehicle.

In step 1406, a front vehicle may transmit information about its steering angle, engine torque, and braking system to a rear vehicle. A front vehicle may transmit additional information such as camera and lidar information indicating the existence or absence of objects and/or their attributes such as velocity.

In step 1408, engine torque, a braking system, and steering at the rear vehicle is commanded without input from a driver. These commands may be based on the information received from the front vehicle in step 1406.

In step 1410, an FTL session is ended between the front and rear vehicles. In response to the FTL session ending, a vehicle may pull over to the side of a road/freeway, and/or operate in a fully autonomous mode (e.g., to continue driving without FTLing, or to travel to a location designated for vehicles that have ended an FTL session to travel to (such as a weigh station)).

VIII. Hardware and Software.

Accordingly, in various embodiments, the invention or portions thereof may be encoded in suitable hardware and/or in software (including firmware, resident software, microcode, HDL code, schematics, etc.). Furthermore, embodiments of the present invention or portions thereof may take the form of a computer program product on a non-transitory computer readable storage medium having computer readable program code comprising instructions encoded in the medium for use by or in connection with an instruction execution system. In some embodiments, the FTL system 100 may comprise such an instruction execution system and connections to the non-transitory computer readable medium. Non-transitory computer readable media on which instructions are stored to execute the methods of the invention may therefore in turn be embodiments of the invention as well. In the context of this application, a computer readable medium may be any medium that can contain, store, communicate, propagate, or transport the program for use by or in connection with the instruction execution system, apparatus, or device.

Figure 13:
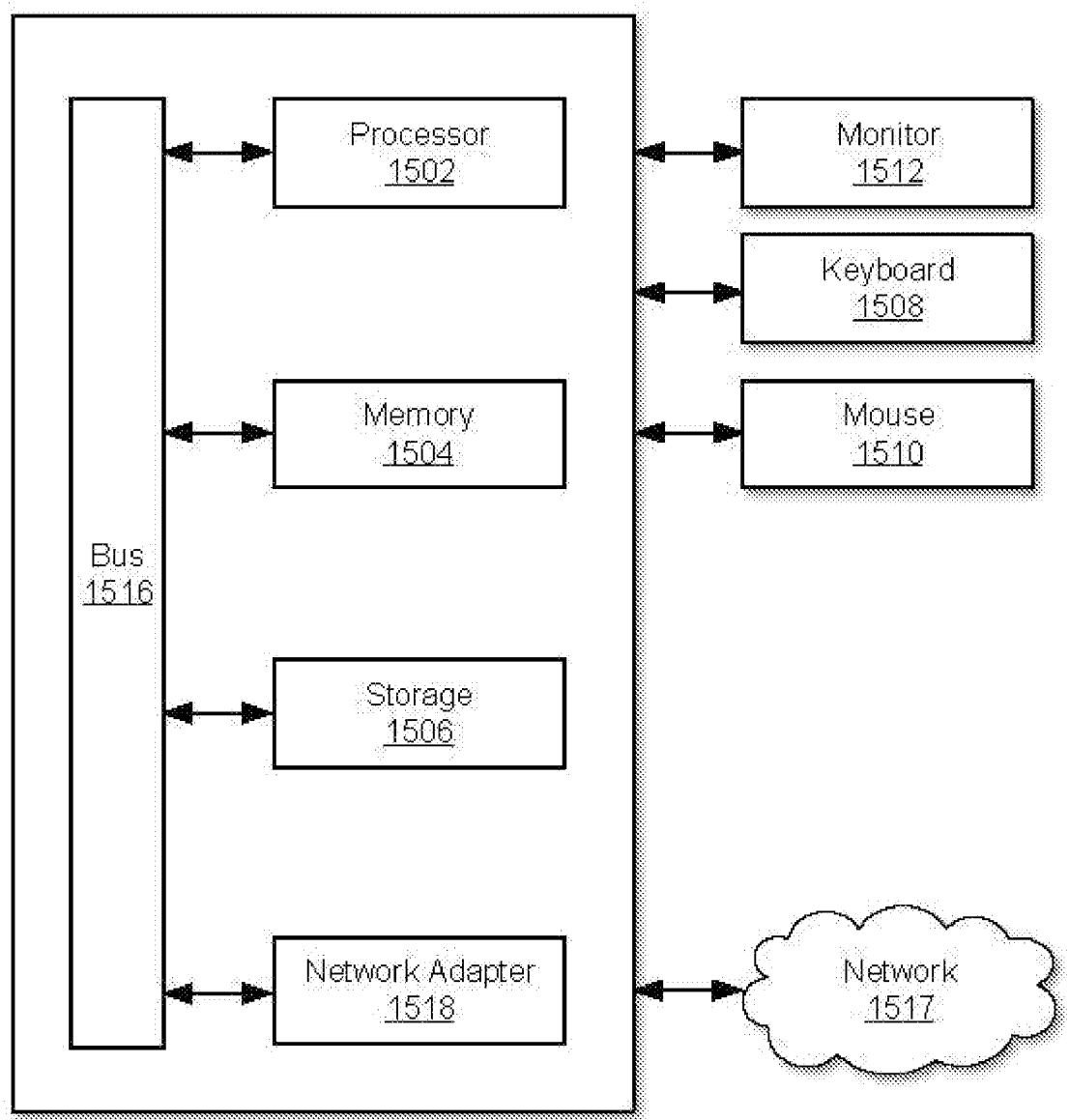
FIG. 13 illustrates an example computing system, in accordance with some embodiments.

FIG. 13 illustrates an example computing system 1500, in accordance with some embodiments.

In various embodiments, the calculations performed above may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

For example, as shown in FIG. 13, example computing system 1500 may include one or more computer processor(s) 1502, associated memory 1504 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 1506 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 1502 may be an integrated circuit for processing instructions. For example, the computer processor(s) may be one or more cores or micro-cores of a processor. The computing system 1500 may also include one or more input device(s) 1510, such as a touchscreen, keyboard, mouse, microphone, touchpad, electronic pen, or any other type of input device. Further, the computing system 1500 may include one or more output device(s) 1508, such as a screen (e.g., a liquid crystal display (LCD), a plasma display, touchscreen, cathode ray tube (CRT) monitor, projector, or other display device), a printer, external storage, or any other output device. The computing system 1500 may be connected to a network 1514 (e.g., a local area network (LAN), a wide area network (WAN) such as the Internet, mobile network, or any other type of network) via a network interface connection 1518. The input and output device(s) may be locally or remotely connected (e.g., via the network 1512) to the computer processor(s) 1502, memory 1504, and storage device(s) 1506.

One or more elements of the aforementioned computing system 1500 may be located at a remote location and connected to the other elements over a network 1514. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

IX. Limitations.

With this application, several embodiments of the invention, including the best mode contemplated by the inventors, have been disclosed. It will be recognized that, while specific embodiments may be presented, elements discussed in detail only for some embodiments may also be applied to others.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

While specific materials, designs, configurations and fabrication steps have been set forth to describe this invention and the preferred embodiments. In the detailed description above, it has been generally assumed that the vehicles are tractor trailer trucks, and that the controlled power plant is an internal combustion engine, as for example a diesel engine. However, it should be appreciated that the described embodiments can be utilized regardless of the nature of the vehicles or the nature of the motive power used to control the vehicle(s) (e.g. liquid or compressed gas internal combustion, turbine, turboprop, fuel cell, etc.), and may apply to electric or hybrid vehicles, as well as to cars, SUVs, vans, light commercial vehicles, motorcycles, unicycles, bicycles, scooters, micromobility devices, or other vehicles. Therefore, the present embodiments should be considered illustrative and not restrictive, and the invention is not to be limited to the details given herein, but may be modified within the scope and equivalents of the appended claims.

What is claimed is:

1. A method for causing a rear vehicle to follow a front vehicle, comprising:
   in response to a driver of the front vehicle activating an FTL (Follow-the-Leader) session;
   establishing a wireless communication link between a front vehicle and a rear vehicle, wherein the wireless communication link transmits front vehicle information including information about its steering angle, engine torque, and braking system; and
   beginning the FTL session, wherein the FTL session comprises:
      transmitting, from the first vehicle to the rear vehicle, the information about the front vehicle's steering angle, engine torque, and braking system; and
      commanding engine torque, a braking system, and steering at the rear vehicle without input from a driver, wherein the commanding of the engine torque, the braking system, and the steering is based on the information about the front vehicle's steering angle, engine torque, and braking system, and wherein the commanding of the engine torque, the braking system, and the steering eliminates the need for driver input.

2. The method of claim 1, wherein the rear vehicle transmits information associated with its brakes to the front vehicle via the wireless link.

3. The method of claim 1, wherein the information about the front vehicle's steering angle, engine torque, and braking system is received from one or more electronic control units (ECUs), abstracted into data that can be provided to a different make of vehicle.

4. The method of claim 3, wherein the FTL session further comprises:
   providing instructions to one or more ECUs located in the rear vehicle, wherein the instructions are at least partially converted in order for the ECUs located in the rear vehicle to operate correctly, and wherein instructions are based at least in part on the abstracted data.

5. The method of claim 1, wherein the rear vehicle and the front vehicle can switch positions.

6. The method of claim 1, further comprising:
   ending the FTL session.

7. The method of claim 6, wherein ending the FTL session comprises:
   causing the rear vehicle to pull off of a road.

8. The method of claim 6, wherein ending the FTL session comprises:
   causing the rear vehicle to operate in a fully autonomous mode.

9. The method of claim 8, further comprising:
   causing the rear vehicle to travel to a designated location.

10. The method of claim 1, wherein the commanding of the engine torque, braking system, and steering at the rear vehicle causes the rear vehicle to perform maneuvers differently than if the rear vehicle were operating in a fully autonomous mode.

* * * * *